(12) United States Patent
Nishimura et al.

(10) Patent No.: US 11,745,340 B2
(45) Date of Patent: Sep. 5, 2023

(54) ROBOT CONTROLLER

(71) Applicant: KABUSHIKI KAISHA YASKAWA DENKI, Kitakyushu (JP)

(72) Inventors: Takashi Nishimura, Fukuoka (JP); Issei Aoyama, Fukuoka (JP); Tetsuro Izumi, Fukuoka (JP); Shangning Li, Fukuoka (JP); Akihiro Yamamoto, Fukuoka (JP)

(*) Notice: Subject to any disclaimer, the term of this patent is extended or adjusted under 35 U.S.C. 154(b) by 321 days.

(21) Appl. No.: 16/997,945

(22) Filed: Aug. 20, 2020

(65) Prior Publication Data

US 2021/0053219 A1 Feb. 25, 2021

(30) Foreign Application Priority Data

Aug. 23, 2019 (JP) .................. 2019-153124

(51) Int. Cl.
*B25J 9/16* (2006.01)
*B25J 13/08* (2006.01)
*G05B 19/4155* (2006.01)

(52) U.S. Cl.
CPC ........... *B25J 9/1633* (2013.01); *B25J 9/1612* (2013.01); *B25J 9/1669* (2013.01); *B25J 9/1694* (2013.01);
(Continued)

(58) Field of Classification Search
CPC ..... B25J 9/00; B25J 9/16; B25J 9/1633; B25J 9/1656; B25J 9/1679; B25J 9/1628; B25J 9/1612; B25J 9/1669; B25J 9/1694; B25J 9/1682; B25J 13/00; B25J 13/08; B25J 13/085; G05B 19/00; G05B 19/02; G05B 19/18; G05B 19/4155; G05B 2219/00; G05B 2219/30; G05B 2219/34; G05B 2219/39; G05B 2219/40; G05B 2219/50; G05B 2219/50391; G05B 2219/34348; G05B 2219/39121; G05B 2219/40201
(Continued)

(56) References Cited

U.S. PATENT DOCUMENTS

2006/0145647 A1 7/2006 Kitatsuji et al.
2016/0243700 A1* 8/2016 Naitou .................. G01L 5/0076
(Continued)

FOREIGN PATENT DOCUMENTS

JP H8-174460 7/1996
JP 2009-297848 12/2009
(Continued)

OTHER PUBLICATIONS

Office Action issued in European Patent Application No. 20191840.6, dated Feb. 18, 2022.
(Continued)

*Primary Examiner* — Khoi H Tran
*Assistant Examiner* — Sarah A Tran
(74) *Attorney, Agent, or Firm* — SOEI PATENT & LAW FIRM

(57) ABSTRACT

A robot system includes: a first robot; a second robot; and circuitry configured to: control the first and second robots to execute a collaborative operation on a work piece; and control, in response to a detection of an irregular state of the first robot during the collaborative operation, the first and second robots to execute a collaborative counteractive operation to eliminate the irregular state.

20 Claims, 15 Drawing Sheets

(52) U.S. Cl.
CPC ........ *B25J 13/085* (2013.01); *G05B 19/4155* (2013.01); *G05B 2219/50391* (2013.01)

(58) Field of Classification Search
USPC ........................................................ 700/248
See application file for complete search history.

(56) References Cited

U.S. PATENT DOCUMENTS

| | | | |
|---|---|---|---|
| 2018/0161979 A1* | 6/2018 | Okamoto | B25J 9/1664 |
| 2019/0126476 A1 | 5/2019 | Nakamura et al. | |
| 2020/0016759 A1* | 1/2020 | Kim | B25J 9/1697 |
| 2020/0376663 A1* | 12/2020 | Voelz | B25J 9/0084 |

FOREIGN PATENT DOCUMENTS

| | | |
|---|---|---|
| JP | 2010-214503 | 9/2010 |
| JP | 2016-153155 | 8/2016 |
| JP | 2018-094649 | 6/2018 |
| JP | 2019-081234 | 5/2019 |

OTHER PUBLICATIONS

Office Action issued in Japanese Patent Application No. P2019-153124, dated Dec. 8, 2020 (with English partial translation).
Extended Search Report in corresponding European Application No. 20191840.6, dated Jan. 25, 2021.
Office Action issued in European Patent Application No. 20191840.6, dated Oct. 18, 2022.

* cited by examiner

ROBOT CONTROLLER

CROSS-REFERENCE TO RELATED APPLICATION

This application is based upon and claims the benefit of priority from Japanese Patent Application No. 2019-153124, filed on Aug. 23, 2019, the entire contents of which are incorporated herein by reference.

BACKGROUND

Field

The present disclosure relates to a robot system, a robot controller, and a robot control method.

Description of the Related Art

Japanese Unexamined Patent Publication No. 2019-081234 discloses a robot system in which, when an external force acting on a robot satisfies a first condition, a reverse withdrawal mode is executed in which the robot is withdrawn by reversing a motion track of the robot, and when an execution situation of the reverse withdrawal mode satisfies a second condition, an external force reduction withdrawal mode is executed in which the robot is withdrawn so that the external force is reduced.

SUMMARY

A robot system disclosed herein includes: a first robot; a second robot; and circuitry configured to: control the first and second robots to execute a collaborative operation on a work piece; and control, in response to a detection of an irregular state of the first robot during the collaborative operation, the first and second robots to execute a collaborative counteractive operation to eliminate the irregular state.

A controller disclosed herein includes circuitry configured to: control a first robot to execute a collaborative operation with a second robot on a work piece; request, in response to a detection of an irregular state of the first robot during the collaborative operation, a controller of the second robot to control the second robot to execute a collaborative counteractive operation to eliminate the irregular state; and control the first robot to execute the collaborative counteractive operation with the second robot to eliminate the irregular state.

A control method disclosed herein includes: controlling a first robot and a second robot to execute a collaborative operation on a work piece; and controlling, in response to a detection of an irregular state of the first robot during the collaborative operation, the first and second robots to execute a collaborative counteractive operation to eliminate the irregular state.

DETAILED DESCRIPTION

Figure 1:
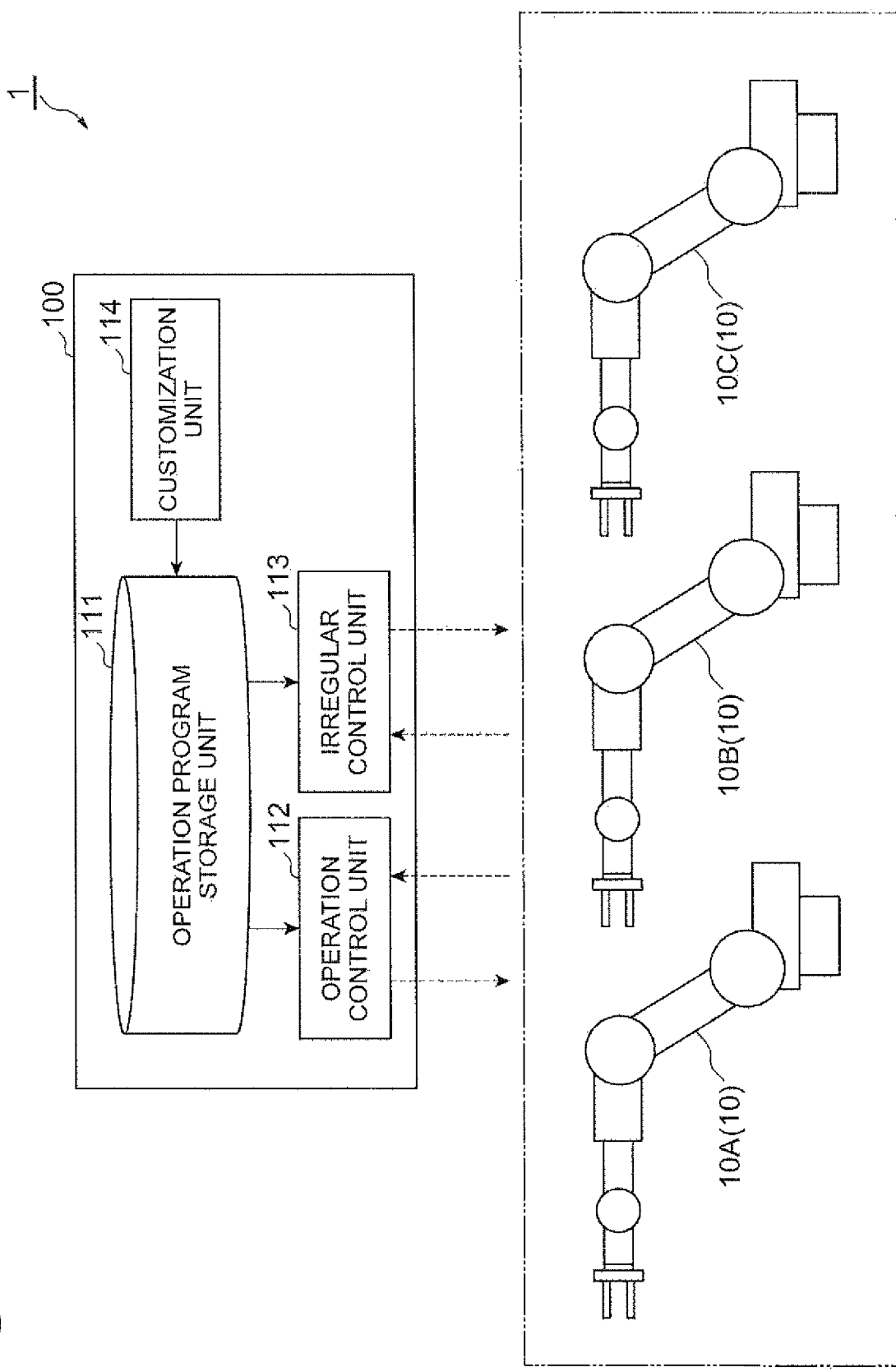
FIG. 1 is a schematic diagram showing an example configuration of a robot system.

Hereinafter, with reference to the drawings, the same elements or elements having the same functions are denoted by the same reference numerals, and redundant explanation is omitted.

[Robot System]

As shown in FIG. 1, a robot system 1 includes three robots 10 and a controller 100. Note that the number of robots 10 included in the robot system 1 may be two or more, and is not limited to three. For example, the number of robots 10 included in the robot system 1 may be two, or may be four or more.

Figure 2:
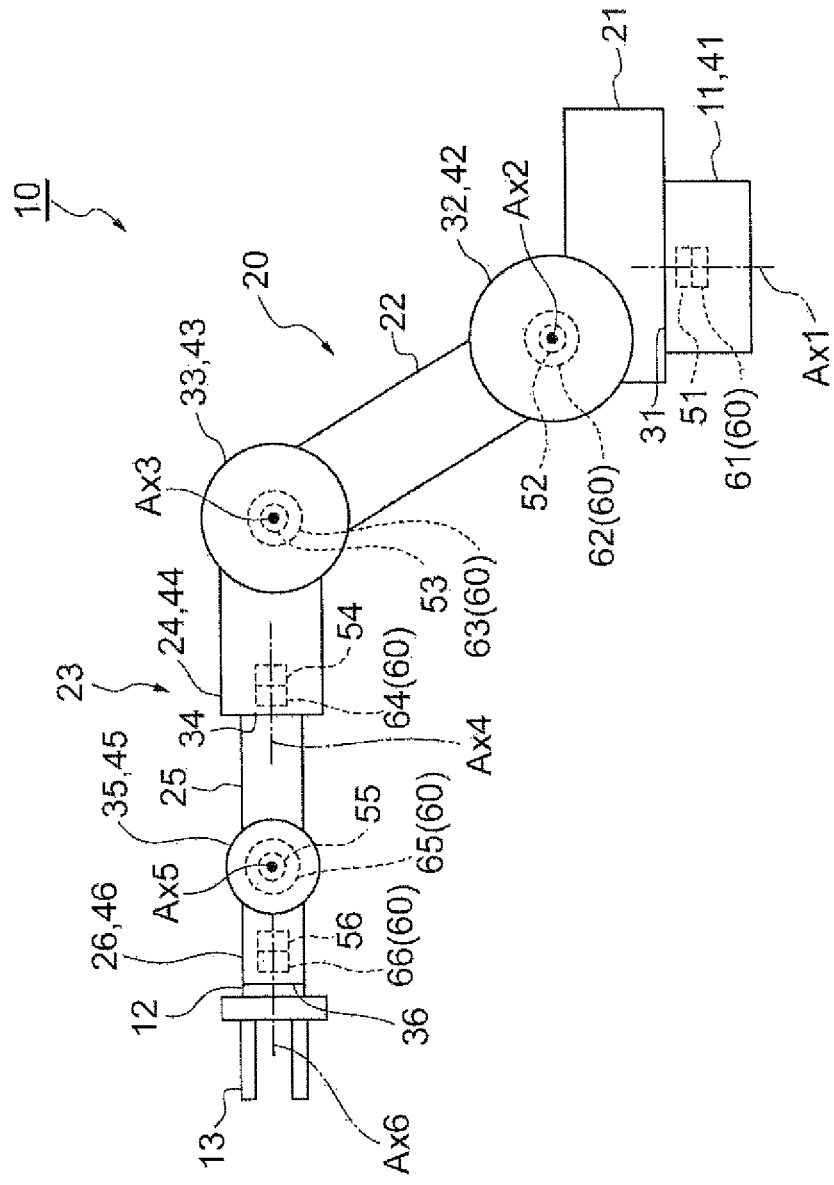
FIG. 2 is a schematic diagram showing an example configuration of a robot.

Each of the three robots 10 is a general-purpose robot capable of performing various work pieces including holding/conveying of a work piece. For example, as shown in FIG. 2, the robot 10 is a 6-axis vertical robot, and has a base portion 11, a tip portion 12, and an articulated arm 20. The base portion 11 is installed, for example, on a floor surface in a work area. The base portion 11 may be installed on a movable carriage.

The tip portion 12 includes a tool 13 for working on the work piece. Examples of the tool 13 include a hand-shaped device for holding the work piece, a welding torch, a coating gun, a screw fastening tool, and the like. The tool 13 of the tip portion 12 can be interchanged or exchanged according to the content of work performed by the robot 10.

The articulated arm 20 connects the base portion 11 and the tip portion 12, and changes a position and a posture of the tip portion 12 with respect to the base portion 11. The articulated arm 20 has a plurality of joints, and the posture of the robot 10 is changed by changing angles of the plurality of joints. As a result, the position and the posture of the tip portion 12 with respect to the base portion 11 are changed.

For example, the articulated arm 20 has a rotation portion 21, a lower arm 22, an upper arm 23, a wrist portion 26, a plurality of actuators 41, 42, 43, 44, 45, and 46, and a plurality of angle sensors 51, 52, 53, 54, 55, and 56.

The rotation portion 21 is provided on the base portion 11 so as to be rotatable around a vertical axis Ax1. For example, the articulated arm 20 has a joint 31 that allows the rotation portion 21 to rotate around the axis Ax1.

The lower arm 22 is connected to the rotation portion 21 so as to be swingable around an axis Ax1 intersecting (for example, orthogonal to) the axis Ax1. For example, the articulated arm 20 has a joint 32 that allows the lower arm 22 to swing around the axis Ax1. Here, the intersection also includes a case where there is a twist relation with each other, such as so-called three-dimensional intersection. The same is applied to the following.

The upper arm 23 is connected to an end portion of the lower arm 22 so as to be swingable around an axis Ax3 intersecting the axis Ax1. That is, the articulated arm 20 has a joint 33 that allows the upper arm 23 to swing around the axis Ax3. The axis Ax3 may be parallel to the axis Ax1.

A tip portion of the upper arm 23 is rotatable around an axis Ax4 along the center of the upper arm 23. For example, the articulated arm 20 has a joint 34 that allows the tip portion of the upper arm 23 to rotate around the axis Ax4. In some examples, a tip portion 25 of the upper arm 23 is rotatable with respect to a base end portion 24 of the upper arm 23.

The wrist portion 26 is connected to the tip portion 25 of the upper arm 23 so as to be swingable around an axis Ax5 intersecting, or orthogonal to, the axis Ax4. For example, the articulated arm 20 has a joint 35 that allows the wrist portion 26 to swing around the axis Ax5.

The tip portion 12 is connected to a tip portion of the wrist portion 26 so as to be rotatable around an axis Ax6 along the center of the wrist portion 26. For example, the articulated arm 20 has a joint 36 that allows the tip portion 12 to rotate around the axis Ax6.

The actuators 41, 42, 43, 44, 45, and 46 use, for example, an electric motor as a power source, and drive a plurality of movable portions of the articulated arm 20, respectively. For example, the actuator 41 rotates the rotation portion 21 around the axis Ax1, the actuator 42 swings the lower arm 22 around the axis Ax1, the actuator 43 swings the upper arm 23 around the axis Ax3, the actuator 44 rotates the tip portion 25 of the upper arm 23 around the axis Ax4, the actuator 45 swings the wrist portion 26 around the axis Ax5, and the actuator 46 rotates the tip portion 12 around the axis Ax6. Accordingly, the actuators 41 to 46 drive the joints 31 to 36, respectively.

The angle sensors 51, 52, 53, 54, 55, and 56 are, for example, rotary encoders, resolvers, or potentiometers, and detect operation angles of the joints 31, 32, 33, 34, 35, and 36, respectively. The angle sensors 51, 52, 53, 54, 55, and 56 may be provided so as to directly detect the angles of the joints 31, 32, 33, 34, 35, and 36, or may be provided so as to detect an operation angle of an output shaft of the electric motor to be the power source of the actuators 41, 42, 43, 44, 45, and 46. When a reducer is provided between the electric motor and the joints 31, 32, 33, 34, 35, and 36, an operation angle of each of the joints 31, 32, 33, 34, 35, and 36 is obtained by executing conversion in accordance with a reduction ratio on the operation angle of the output shaft of the electric motor.

The robot system 1 may be a human-collaborative system that controls the robot 10 to cooperate with a person. In some examples, the robot 10 may be a human-collaborative robot. The human-collaborative robot is a robot cooperating with a person in the human-collaborative system. The term "cooperating with the person" means that working is performed in a space where the person is not restricted from entering. The human-collaborative robot may be configured to detect an approach to or a contact with the person.

As an example, the robot 10 further has a reaction force sensor 60 that detects a reaction force (hereinafter, referred to as an "irregular reaction force") associated with contacting a peripheral object. Note that the term "peripheral object" may include a human body. For example, the reaction force sensor 60 includes a torque sensor that detects a torque acting on at least one joint of the robot 10. For example, the reaction force sensor 60 includes torque sensors 61, 62, 63, 64, 65, and 66 that detect torques acting on the joints 31, 32, 33, 34, 35, and 36 of the robot 10, respectively. The torque sensors 61, 62, 63, 64, 65, and 66 are torque sensors of strain gauge types or the like, for example. Note that values detected by the torque sensors 61, 62, 63, 64, 65, and 66 may include a torque generated by the inertia of the robot 10 (hereinafter, referred to as an "inertia torque"). In some examples, the inertia torque is calculated by dynamics calculation based on a shape, a dimension, and a weight of each part of the robot 10, and a calculation result is subtracted from the detection value of each of the torque sensors 61, 62, 63, 64, 65, and 66, so that the irregular reaction force is obtained.

The reaction force sensor 60 may include pressure sensors that detect a force acting on an outer cover of the robot 10, instead of the torque sensors. The reaction force sensor 60 may include both the torque sensors and the pressure sensors.

Instead of the reaction force sensor 60, the robot 10 may have a proximity sensor that detects an approach to the peripheral object in a non-contact manner. Examples of the proximity sensor include an infrared sensor, an ultrasonic sensor, a camera, and the like. The robot 10 may have both the reaction force sensor 60 and the proximity sensor.

The example robot 10 may include other configurations which also adjust the position and the posture of the tip portion 12 with respect to the base portion 11. For example, the robot 10 may be a 7-axis robot in which a redundant axis is added to the 6-axis vertical articulated robot. Further, the robot 10 may be a so-called scalar type robot.

The robot system 1 may include a double-arm type robot as an example of the two robots 10. The double-arm type robot has a movable torso and two robots 10 mounted on the torso. The two robots 10 mounted on the torso correspond to double arms of the double-arm type robot.

Returning to FIG. 1, the controller 100 is configured to control at least two robots 10 to execute a collaborative operation on a work piece, and control the two robots 10 to collaboratively execute a counteractive operation to eliminate an irregular state in response to a detection of the irregular state of one of the at least two robots 10 executing the collaborative operation. For example, in a case that the robot system 1 includes a first robot 10 and a second robot 10, the controller 100 may be configured to control the first and second robots 10 to execute a collaborative operation on a work piece, and to control, in response to a detection of an irregular state of the first robot 10 during the collaborative operation, the first and second robots 10 to execute a collaborative counteractive operation to eliminate the irregular state. The controller 100 may be further configured to control, in response to a detection of an irregular state of the second robot 10 during the collaborative operation, the first and second robots 10 to execute a second collaborative counteractive operation to eliminate the irregular state of the second robot 10.

The collaborative operation means that operations are executed while one operation affects the other operation. Here, the operation also includes maintaining a stationary or stand-by state. The collaborative operation may mean that the operations are simultaneously executed while one operation affects the other operation. Examples of the collaborative operation include an operation in which at least two robots 10 collaboratively hold and convey the same work piece, an operation in which one of the robots 10 changes the posture of the work piece and other robot 10 processes the work piece, and the like.

An operation in which a work piece held by one of the robots 10 (hereinafter, referred to as a "first work piece") is mounted with a work piece held by other robot 10 (hereinafter, referred to as a "second work piece") is also included in the "collaborative operation on a work piece". This is because the robot 10 holding the first work piece executes an operation on the second work piece via the first work piece, and the robot 10 holding the second work piece executes an operation on the first work piece via the second work piece.

The controller 100 may be configured to further control at least two robots 10 to execute individual operations independent of each other, to control one of the at least two robots 10 executing the individual operations to execute a counteractive operation and to control the other robot 10 to continue the individual operation in response to the detection of the irregular state of one robot 10. The controller 100 may be further configured to control the first robot 10 to execute a first individual operation and control the second robot 10 to execute a second individual operation, and control, in response to a detection of a second irregular state of the first robot 10 during the first individual operation, the first robot 10 to execute an individual counteractive operation to eliminate the second irregular state while the second robot 10 continues to execute the second individual operation.

The individual operations may be independently or individually executed while one operation does not affect the other operation. Examples of the individual operations include an operation in which the two robots 10 convey two work pieces, respectively, and the like.

Note that an operation in which the two robots 10 respectively process two parts of the same work piece fixed to a work area is also included in the individual operations. This is because, if the work piece is fixed to the work area, the operation of one robot 10 does not affect the operation of the other robot 10.

When one of the three robots 10 (hereinafter, referred to as a "robot 10A") executes a collaborative operation with another robot 10 (hereinafter, referred to as a "robot 10B"), but the robot 10A does not execute the collaborative operation with the other robot 10 (hereinafter, referred to as a "robot 10C"), the robots 10A and 10B are two robots that execute the collaborative operation, and the robots 10A and 10C are two robots that execute the individual operations independent of each other. The robot 10B and the robot 10C are also two robots that execute the individual operations independent of each other. Accordingly, the "individual operation" only means an operation relation between the two robots 10, and does not mean that the robots 10 do not execute the collaborative operation with each other. Hereinafter, in the description applicable to both the collaborative operation and the individual operation, these are collectively referred to as a "normal operation".

Additionally, the irregular state means a state in which continuation of the normal operation is not allowed. Specific examples of the irregular state include approaching a peripheral object in which an approach is not assumed, contacting a peripheral object in which a contact is not assumed, and the like.

Eliminating the irregular state means controlling the irregular state not to be detected. For example, when the irregular state is the approach to the peripheral object, separating from the peripheral object to the extent that the approach to the peripheral object is not detected corresponds to eliminating the irregular state. When the irregular state is the contact with the peripheral object, separating from the peripheral object corresponds to eliminating the irregular state. In the case of the irregular state in which the magnitude can be represented like an irregular reaction force described later, reducing the magnitude also corresponds to eliminating the irregular state.

Controlling the two robots to collaboratively execute a counteractive operation means controlling the two robots to execute the counteractive operation so that the cooperation for the same work piece is maintained. As a specific example of maintaining the cooperation for the same work piece, in the two robots that collaboratively hold the same work piece, holding of the work piece is maintained.

Figure 15A:
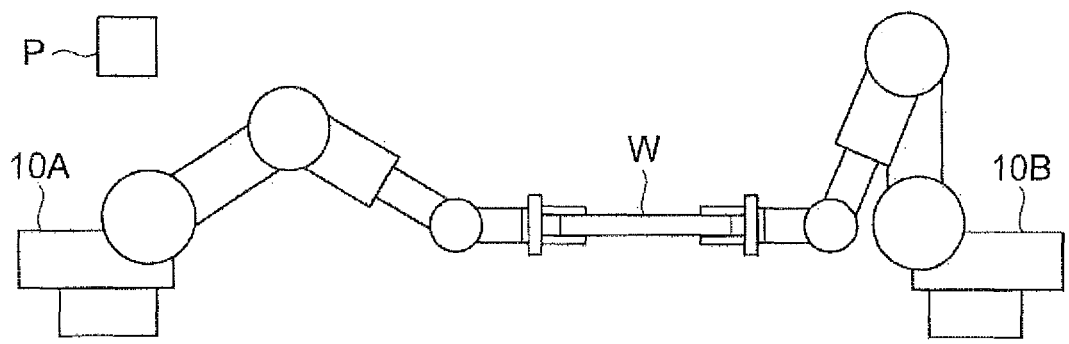
FIGS. 15A, 15B, and 15C are schematic diagrams showing two robots which convey a work piece.
Figure 15B:
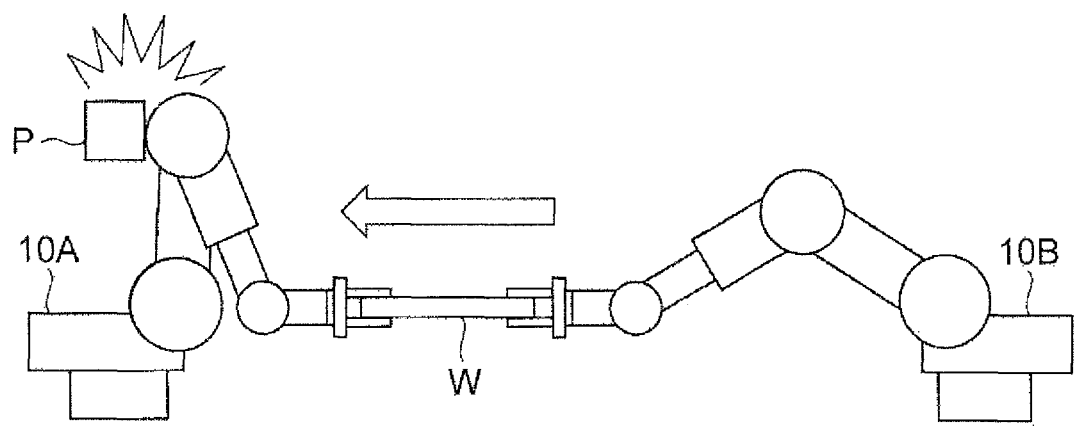

FIG. 15A illustrates two robots 10 (a first robot 10A and a second robot 10B) collaboratively holding and conveying a work piece W, which is an example of the collaborative operation. FIG. 15B illustrates a state in which one of the robots 10 (the first robot 10A) comes in contact with a peripheral object P. The controller 100 detects the irregular state by detecting contact with the peripheral object P.

Figure 15C:
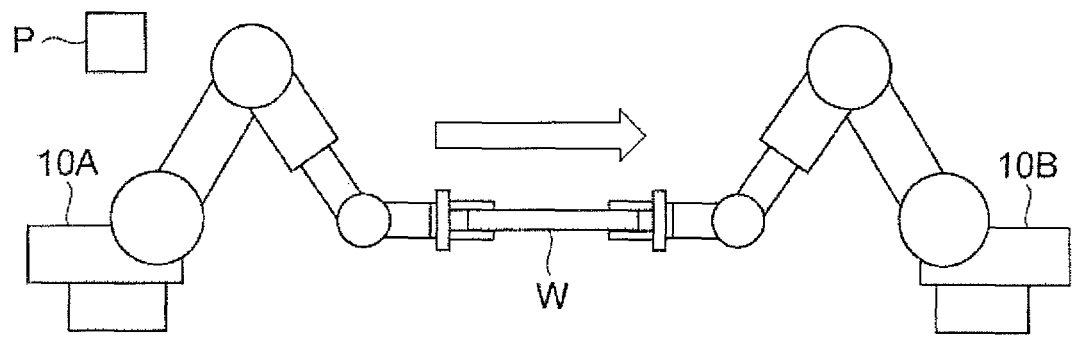

FIG. 15C illustrates two robots 10 executing a collaborative counteractive operation including moving away from the peripheral object P. The controller 100 is configured to control, in response to the detection of the irregular state, the first and second robots to execute the collaborative counteractive operation which includes moving away from the peripheral object.

In some examples, the controller 100 has an operation program storage unit 111, an operation control unit 112, and an irregular control unit 113 as functional configurations (hereinafter, referred to as "functional blocks").

The operation program storage unit 111 stores an operation program for controlling the robot 10 to execute the collaborative operation or the individual operation. The operation program includes a plurality of time-series operation commands for all three robots. For example, the operation program includes a plurality of operation commands arranged in the execution order in the normal operation (hereinafter, referred to as the "normal order") for all three robots. The operation commands include a position/posture target value of the tip portion 12 of each robot 10, a displacement speed to the position/posture target value, an interpolation method to the position/posture target value, and the like. Specific examples of the interpolation method include a linear interpolation for causing a displacement from a current position/posture to the position/posture target value to be linear and the like.

The plurality of operation commands include a collaborative operation command. The collaborative operation command is an operation command for executing a collaborative operation with at least one other robot 10. The collaborative operation command may include an operation command for one robot 10 and a cooperation command for other robot 10. The cooperation command includes at least identification information of other robot 10.

In accordance with the operation command of one robot 10 and the cooperation command, an operation command for controlling other robot 10 may be automatically generated to execute the collaborative operation by calculation. Therefore, the operation program may not include an operation command for other cooperation robot 10 designated by the cooperation command.

In accordance with the cooperation command, whether at least two robots 10 among the three robots 10 execute the collaborative operation and which of the robots 10 execute the collaborative operation are indicated in time series. Therefore, the cooperation command is an example of information (hereinafter, referred to as "cooperation information") indicating in time series whether operation commands of at least two robots 10 are in a cooperation relation (a relation for executing the collaborative operation). Further, the cooperation command is an example of cooperation information indicating in time series which of the three robots 10 have the operation commands in the cooperation relation.

The plurality of operation commands may further include an individual operation command. The individual operation command is an operation command for executing an individual operation independent of the operation of other robot 10.

The operation control unit 112 controls at least two robots 10 to execute a collaborative operation on the same work piece. The operation control unit 112 may control at least two robots to further execute individual operations independent of each other. The operation control unit 112 controls the three robots 10 to execute the normal operation, in accordance with the operation program stored in the operation program storage unit 111. For example, the operation control unit 112 sequentially executes controlling the robot 10 so as to displace the tip portion 12 in accordance with the operation command, in the normal order for the three robots 10. In some examples, the operation control unit may be configured to control the first and second robots 10 to execute a collaborative operation on a work piece.

The operation control unit 112 repeatedly executes control for the three robots 10 at the same control cycle. For example, the operation control unit 112 repeatedly executes operating the robot 10 so as to reduce a deviation between the target posture of the robot 10 based on the operation command and the current posture of the robot 10, at the same control cycle for the three robots 10. For example, at each control cycle, the operation control unit 112 calculates angle target values of the joints 31, 32, 33, 34, 35, and 36 corresponding to the operation commands by inverse kinematics calculation, and drives the actuators 41, 42, 43, 44, 45, and 46 so as to reduce deviations between angle target values of the joints 31, 32, 33, 34, 35, and 36 and current angles (values detected by the angle sensors 51, 52, 53, 54, 55, and 56) of the joints 31, 32, 33, 34, 35, and 36.

The operation control unit 112 controls at least two robots 10 to execute the collaborative operation, in accordance with the collaborative operation command in the operation program. For example, the operation control unit 112 controls at least two robots 10 to execute a collaborative operation of holding and conveying the same work piece in cooperation with each other. The operation control unit 112 controls each of the three robots 10 to execute an individual operation, in accordance with the individual operation command in the operation program.

In response to the detection of the irregular state of any one of the three robots 10, the irregular control unit 113 controls at least one robot 10 (hereinafter, referred to as an "irregular robot") to execute the counteractive operation. The irregular control unit 113 may control the irregular robot to execute the counteractive operation so that a posture of the irregular robot changes from a posture at a point of time of detection of the irregular state. In an example, the irregular control unit 113 may be configured to change a posture of the first robot 10 and a posture of the second robot 10 in the collaborative counteractive operation.

Examples of the detection of the irregular state include detection of the irregular reaction force by the reaction force sensor 60, detection of the irregular approach by the proximity sensor, and the like. The irregular reaction force means a reaction force at a level where continuation of the normal operation is not allowed. The irregular approach means an approach at a level where continuation of the normal operation is not allowed.

In some examples, in response to a detection of the irregular reaction force by the reaction force sensor 60 of any one of the three robots 10, the irregular control unit 113 may regard the corresponding robot 10 as an irregular robot, and may control the irregular robot to execute the counteractive operation so as to reduce the irregular reaction force. In some examples, the irregular control unit 113 may be configured to control, in response to the detection of the irregular state of the first robot 10 based on the reaction force detected during the collaborative operation, the first and second robots 10 to execute the collaborative counteractive operation to reduce the reaction force by moving away from the peripheral object.

In some examples, the irregular control unit 113 controls the irregular robot to execute the counteractive operation so as to roll back the normal operation of the irregular robot to a point of time of detection of the irregular reaction force, to a point of time before the point of time of detection. In an example, the collaborative operation may include sequential motions, and the irregular control unit 113 may be configured to control the first and second robots 10 to execute the sequential motions in reverse order from a point in time that the irregular state of the first robot 10 was detected. For example, the irregular control unit 113 sequentially executes controlling the robots 10 so as to displace the tip portion 12 in accordance with the operation command, in the reverse order of the normal order from the point of time of detection of the irregular reaction force. Since the irregular reaction force is generated as a result of the normal operation, the irregular reaction force may be reduced by rolling back the normal operation. Hereinafter, the counteractive operation by the rolling back of the normal operation is referred to as a "roll back operation".

The irregular control unit 113 may calculate an action site and an action direction of the irregular reaction force, and may control the irregular robot to execute the counteractive operation so as to displace the action site along the action direction. For example, the irregular control unit 113 calculates an operation program for the counteractive operation (hereinafter, referred to as a "counteractive operation program") so as to move the action site along the action direction by a predetermined distance or for a predetermined time, and controls the irregular robot to execute the counteractive operation in accordance with the counteractive operation program.

The counteractive operation program includes a plurality of time-series operation commands (hereinafter, referred to as "counteractive operation commands"). For example, the counteractive operation program includes a plurality of counteractive operation commands arranged in the execution order in the counteractive operation (hereinafter, referred to as "counteraction order"). The counteractive operation commands include a position/posture target value of the tip portion 12, a displacement speed to the position/posture target value, an interpolation method to the position/posture target value, and the like.

The irregular control unit 113 controls the irregular robot to execute the counteractive operation in accordance with the counteractive operation program. For example, the irregular control unit 113 sequentially executes controlling the irregular robot so as to displace the tip portion 12 in accordance with the counteractive operation command, in the counteraction order. Hereinafter, the counteractive operation for moving the action site along the action direction is referred to as a "reaction force following operation".

The irregular control unit 113 may modify a motion amount of the counteractive operation of the irregular robot based on the magnitude of the irregular reaction force. In some examples, the irregular control unit 113 may be configured to modify a motion amount of the collaborative counteractive operation based on a magnitude of the reaction force. For example, the irregular control unit 113 may increase the motion amount of the counteractive operation of the irregular robot, in accordance with an increase in the irregular reaction force. In the case of the roll back operation, the irregular control unit 113 may increase a roll back time of the normal operation from the point of time of detection of the irregular reaction force, in accordance with the increase in the irregular reaction force. In the case of the reaction force following operation, the irregular control unit 113 may increase a displacement distance or a displacement time of the action site in the action direction, in accordance with the increase in the irregular reaction force.

Further, when the irregular robot is controlled to execute the counteractive operation with a predetermined motion amount so as to reduce the irregular reaction force and then the irregular reaction force is detected again by the reaction force sensor 60 of the irregular robot, the irregular control unit 113 may control the irregular robot to execute a further counteractive operation so as to further reduce the irregular reaction force. In some examples, the irregular control unit 113 may be configured to control the first and second robots 10 to execute a further collaborative counteractive operation in response to a detection of a further reaction force after execution of the collaborative counteractive operation.

In the case of the roll back operation, when the irregular robot is controlled to execute the roll back operation from the point of time of detection of the irregular reaction force to a point of time before a predetermined time and then the irregular reaction force is detected again by the reaction force sensor 60 of the irregular robot, the irregular control unit 113 may control the irregular robot to further execute the counteractive operation to a point of time before a time longer than the predetermined time.

In the case of the reaction force following operation, when the action site is moved in the action direction by a predetermined distance or for a predetermined time and then the irregular reaction force is detected again by the reaction force sensor 60 of the irregular robot, the irregular control unit 113 may control the irregular robot to execute a further reaction force following operation.

The irregular control unit 113 may switch a method of the counteractive operation before and after reconfirming the irregular reaction force. For example, when the irregular robot is controlled to execute the roll back operation from the point of time of detection of the irregular reaction force to the point of time before the predetermined time and then the irregular reaction force is detected again by the reaction force sensor 60 of the irregular robot, the irregular control unit 113 may control the irregular robot to execute the reaction force following operation. The irregular control unit 113 may be configured to select, in response to a detection of an unidentified irregular state of the first robot, any one of a first response mode in which the first and second robots are controlled to execute the collaborative counteractive operation and a second response mode in which the first robot 10 is controlled to execute the individual counteractive operation while the second robot 10 continues to execute the second individual operation; and control the first and second robots 10 in accordance with selected response mode. The unidentified irregular state is a state which has not yet been identified as being one of the irregular state of the first robot or the second irregular state of the first robot. For example, the operation control unit 112 may be configured to control the first and second robots 10 in accordance with an operation program including a collaborative period associated with the collaborative operation and an individual period associated with the first and the second individual operations, and the irregular control unit 113 may be configured to select the first response mode if the unidentified irregular state is detected during the collaborative period and select the second response mode if the unidentified irregular state is detected during the individual period.

In response to the detection of the irregular state of one of at least two robots 10 (hereinafter, referred to as "a plurality of cooperation robots") executing the collaborative operation, the irregular control unit 113 controls the plurality of cooperation robots to collaboratively execute the counteractive operation to eliminate the irregular state. In some examples, the irregular control unit 113 may be configured to control, in response to a detection of an irregular state of the first robot 10 during the collaborative operation, the first and second robots 10 to execute a collaborative counteractive operation to eliminate the irregular state. The irregular control unit 112 may be further configured to control, in response to a detection of an irregular state of the second robot 10 during the collaborative operation, the first and second robots 10 to execute a second collaborative counteractive operation to eliminate the irregular state of the second robot 10. For example, the irregular control unit 113 controls the plurality of cooperation robots to collaboratively execute the counteractive operation so that a position and a posture of the tip portion of the irregular robot are used as a reference to maintain a relative position and a relative posture of the tip portion 12 of other cooperation robot. When the irregular robot is controlled to execute the roll back operation, the irregular control unit 113 also controls other cooperation robot to execute the roll back operation in synchronization with the roll back operation. In some examples, the irregular control unit 113 may be further configured to control the first and second robots to maintain a relative relationship between the position and the posture of the tip portion of the first robot and the position and the posture of the tip portion of the second robot in the collaborative counteractive operation.

When the irregular robot is controlled to execute the reaction force following operation, the irregular control unit 113 calculates a counteractive operation program that further includes a plurality of counteractive operation commands to other cooperation robot. For example, the irregular control unit 113 calculates a counteractive operation command for other cooperation robot so that the position and the posture of the tip portion of the irregular robot executing the reaction force following operation are used as a reference to maintain the relative position and the relative posture of the tip portion 12 of other cooperation robot. Hereinafter, the counteractive operation command for the irregular robot is referred to as a "master-side operation command", and the counteractive operation command for other cooperation robot is referred to as a "slave-side operation command".

The irregular control unit 113 controls the irregular robot and other cooperation robot to execute the counteractive operation in accordance with the counteractive operation program. More specifically, the irregular control unit 113 sequentially executes controlling the irregular robot so as to displace the tip portion 12 in accordance with the master-side operation command and controlling other cooperation robot so as to displace the tip portion 12 in accordance with the slave-side operation command, in the counteraction order.

When the irregular robot is a cooperation robot, the irregular control unit 113 may modify the motion amount of the counteractive operation to be executed collaboratively by the plurality of cooperation robots, based on the magnitude of the irregular reaction force in the irregular robot. For example, the irregular control unit 113 may increase the motion amount of the counteractive operation to be executed collaboratively by the plurality of cooperation robots, in accordance with the increase in the irregular reaction force.

Further, when the plurality of cooperation robots are controlled to execute the counteractive operation with a predetermined motion amount so as to reduce the irregular reaction force and then the irregular reaction force is detected again by the reaction force sensor 60 of the irregular robot, the irregular control unit 113 may control the plurality of cooperation robots to collaboratively execute a further counteractive operation so as to further reduce the irregular reaction force.

In response to the detection of the irregular state of one of at least two robots 10 executing the individual operation, the irregular control unit 113 may control the irregular robot to execute the counteractive operation and other robot 10 to continue the individual operation. In some examples, the operation control unit 112 may be further configured to control the first robot 10 to execute a first individual operation and control the second robot 10 to execute a second individual operation, and the irregular control unit 113 may be further configured to control, in response to a detection of a second irregular state of the first robot 10 during the first individual operation, the first robot 10 to execute an individual counteractive operation to eliminate the second irregular state while the second robot 10 continues to execute the second individual operation. Hereinafter, controlling the irregular robot to execute the counteractive operation and other robot 10 to continue the individual operation is referred to as "irregular processing in an individual mode". On the other hand, controlling the plurality of cooperation robots including the irregular robot to collaboratively execute the counteractive operation is referred to as "irregular processing in a cooperation mode". Further, the irregular processing in the individual mode and the irregular processing in the cooperation mode are collectively referred to as "irregular processing".

The irregular processing in the cooperation mode includes irregular processing for controlling the other robots 10 to execute the counteractive operation (hereinafter, referred to as "irregular processing in a complete cooperation mode"), and irregular processing for controlling another robot 10 to execute the counteractive operation while controlling other robot 10 to continue the individual operation (hereinafter, referred to as "irregular processing in a mixed mode"). For example, in a case that the robot system 1 includes a third robot 10, the operation control unit 112 may be further configured to control the third robot 10 to execute a third individual operation, and the irregular control unit 113 may be further configured to control, in response to the detection of the irregular state of the first robot 10, the first and second robots 10 to execute the collaborative counteractive operation while the third robot 10 continues to execute the third individual operation.

Even in any irregular processing, the irregular control unit 113 may repeatedly execute control for the three robots 10 at the same control cycle. For example, the irregular control unit 113 repeatedly executes operating the robot 10 so as to reduce a deviation between the target posture of the robot 10 based on the operation command or the counteractive operation command and the current posture of the robot 10, at the same control cycle for the three robots 10.

In some examples, at each control cycle, the irregular control unit 113 calculates angle target values of the joints 31, 32, 33, 34, 35, and 36 corresponding to the operation commands or the counteractive operation commands by inverse kinematics calculation, and drives the actuators 41, 42, 43, 44, 45, and 46 so as to reduce deviations between the angle target values of the joints 31, 32, 33, 34, 35, and 36 and current angles (values detected by the angle sensors 51, 52, 53, 54, 55, and 56) of the joints 31, 32, 33, 34, 35, and 36.

The irregular control unit 113 selects any one of the irregular processing in the cooperation mode and the irregular processing in the individual mode, based on a relation between the operation command for the irregular robot and the operation command for other robot 10. In some examples, the operation program may further include first sequential operation commands for the first robot 10 and second sequential operation commands for the second robot 10, and the irregular control unit 113 may be further configured to detect the collaborative period and the individual period based on a comparison between the first sequential operation commands and the second sequential operation commands. For example, when the operation command for the irregular robot and the operation command for other robot 10 are in a cooperation relation, the irregular control unit 113 may select the irregular processing in the cooperation mode, and may control other robot 10 to execute the counteractive operation. In examples where the operation command for the irregular robot and the operation command for other robot 10 are in a cooperation relation, the position and the posture of the tip portion of the irregular robot may be used as a reference and the relative position and the relative posture of the tip portion 12 of other robot 10 are constantly maintained.

The irregular control unit 113 may select any one of the irregular processing in the cooperation mode and the irregular processing in the individual mode, based on the cooperation information included in the operation program. For example, when the cooperation information indicates that the operation commands of at least two robots 10 including the irregular robot are in a cooperation relation, the irregular control unit 113 may select the irregular processing in the cooperation mode, and may control the at least two robots 10 to collaboratively execute the counteractive operation. In some examples, the operation program may further include first sequential operation commands for the first robot 10 and second sequential operation commands for the second robot 10, the second sequential operation commands may include normal commands each of which defines the second individual operation and collaboration commands each of which designates one of the first sequential operation commands as a target of collaboration, and the operation control unit 112 may be further configured to control the second robot to execute the collaborative operation based on the collaboration commands and the first sequential operation commands, and the irregular control unit 113 may be further configured to detect the collaborative period and the individual period based on the normal commands and the collaboration commands. The collaboration commands correspond to the above-stated cooperation information.

In some examples, the operation program may further include a designated period overlapping with the collaborative period, and the controller 100 may be further configured to modify the designated period based on user input, and to select the first response mode if the unidentified irregular state is detected during the designated period. In response to the detection of the irregular state of any one of the robots 10, the controller 100 may acquire collaborative release information indicating in time series whether to control at least two robots 10 to collaboratively execute the counteractive operation, based on user input, and in response to the detection of the irregular state of any one of the robots 10, the controller 100 may select any one of the irregular processing in the cooperation mode and the irregular processing in the individual mode, based on the collaborative release information. The designated period corresponds to a period in which at least two robots 10 are required to cooperatively perform the counteractive operation by the collaborative release information.

In some examples, the controller 100 may further have a customization unit 114. The customization unit 114 acquires the collaborative release information, based on the user input (for example, input to an input device 126 described later). For example, the customization unit 114 acquires the collaborative release information indicating in time series which of the three robots 10 is controlled to collaboratively execute the counteractive operation, based on the user input, and records the collaborative release information in the operation program storage unit 111. As an example, the customization unit 114 records the operation command of the robot 10 controlled to collaboratively execute the counteractive operation and a release-time cooperation command indicating whether to execute the counteractive operation in cooperation with other robot 10, in the operation program storage unit 111 in association with each other.

When the controller 100 further has the customization unit 114, the irregular control unit 113 selects any one of the irregular processing in the cooperation mode and the irregular processing in the individual mode, based on the collaborative release information. For example, when the collaborative release information indicates that at least two robots 10 including the irregular robot are controlled to collaboratively execute the counteractive operation, the irregular control unit 113 selects the irregular processing in the cooperation mode, and controls the at least two robots 10 to collaboratively execute the counteractive operation.

Figure 3:
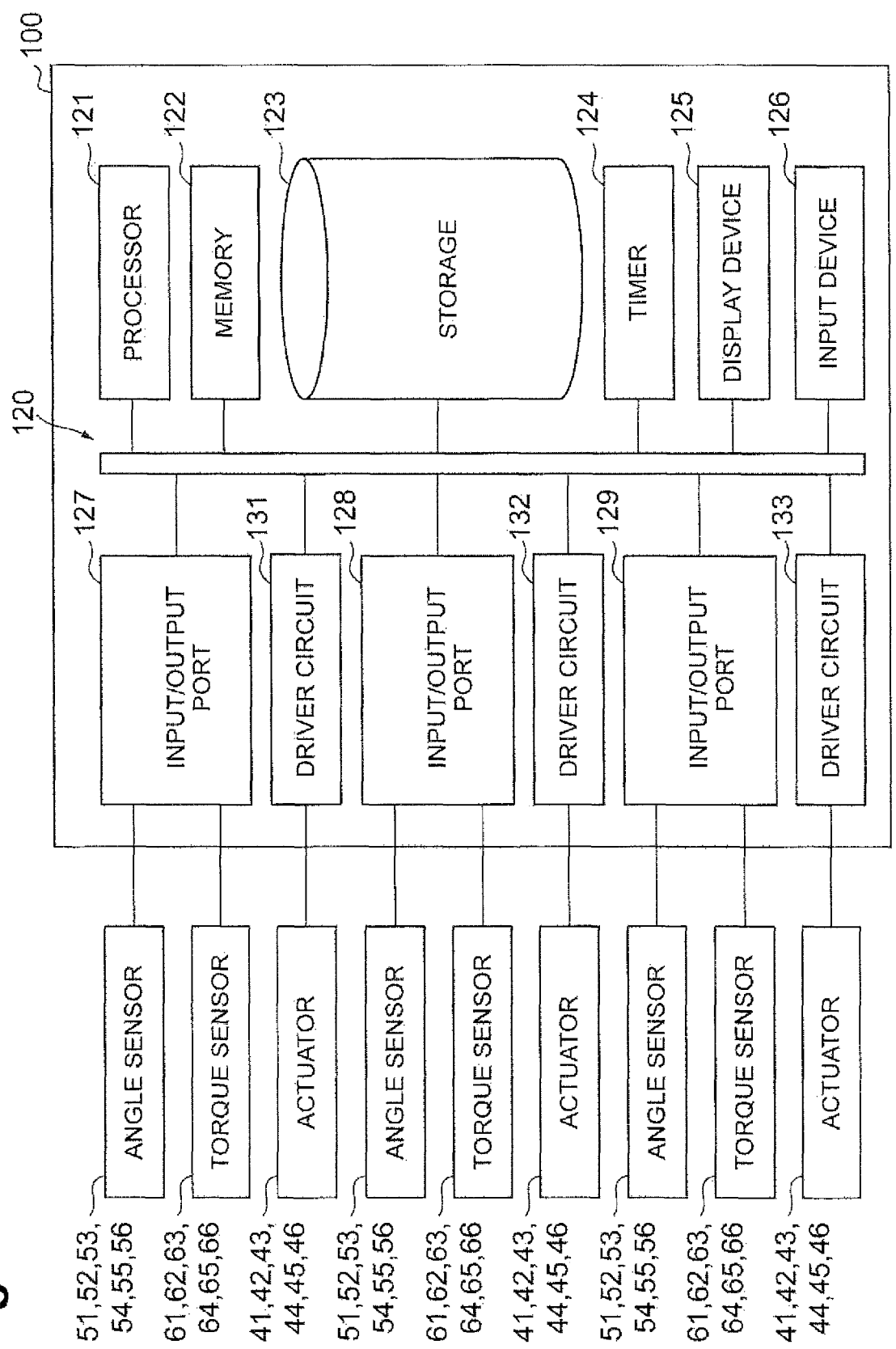
FIG. 3 is a block diagram showing an example hardware configuration of a controller.

FIG. 3 is a block diagram showing an example of a hardware configuration of the controller 100. As shown in FIG. 3, the controller 100 has a circuit 120. The circuit 120 includes one or more processors 121, a memory 122, a storage 123, a timer 124, a display device 125, an input device 126, input/output ports 127, 128, and 129, and driver circuits 131, 132, and 133. The storage 123 has a computer-readable storage medium such as a non-volatile semiconductor memory. The storage 123 stores a program for causing the controller 100 to control at least two robots 10 to execute a collaborative operation on the same work piece and to control the two robots 10 to collaboratively execute the counteractive operation to eliminate the irregular state, in response to the detection of the irregular state of one of the at least two robots 10 executing the collaborative operation. For example, the storage 123 stores a program for configuring each functional block described above in the controller 100.

The memory 122 temporarily stores a program loaded from the storage medium of the storage 123 and a calculation result of the processor 121. The processor 121 configures each functional block of the controller 100 by executing the above program in cooperation with the memory 122. The timer 124 measures an elapsed time by counting clock pulses of a predetermined cycle in accordance with a command from the processor 121. The display device 125 includes, for example, a liquid crystal display, an organic EL display, or the like, and is used for displaying information to the user. The input device 126 acquires operation input by the user. Examples of the input device 126 include a keypad and the like. The display device 125 and the input device 126 may be integrated as a so-called touch panel. The display device 125 and the input device 126 may be teaching pendants that are separated from a main body of the controller 100 and communicate with the main body by wire or wirelessly.

The input/output port 127 inputs/outputs information to/from the angle sensors 51 to 56 and the torque sensors 61 to 66 of the robot 10A, in accordance with a command from the processor 121. The input/output port 128 inputs/outputs information to/from the angle sensors 51 to 56 and the torque sensors 61 to 66 of the robot 10B, in accordance with a command from the processor 121. The input/output port 129 inputs/outputs information to/from the angle sensors 51 to 56 and the torque sensors 61 to 66 of the robot 10C, in accordance with a command from the processor 121.

The driver circuit 131 outputs drive power to the actuators 41 to 46 of the robot 10A, in accordance with a command from the processor 121. The driver circuit 132 outputs drive power to the actuators 41 to 46 of the robot 10B, in accordance with a command from the processor 121. The driver circuit 133 outputs drive power to the actuators 41 to 46 of the robot 10C, in accordance with a command from the processor 121.

The circuit 120 may comprise a program for configuring each function by a program. In other examples, the circuit 120 may configure at least a part of the functions by a dedicated logic circuit or an application specific integrated circuit (ASIC) in which the logic circuit is integrated.

[Control Procedure]

Hereinafter, an example control procedure executed by the controller 100 is described. The control procedure includes controlling at least two robots 10 to execute a collaborative operation on the same work piece, and controlling two robots 10 to collaboratively execute the counteractive operation to eliminate the irregular state, in response to the detection of the irregular state of one of the at least two robots 10 executing the collaborative operation.

Figure 4:
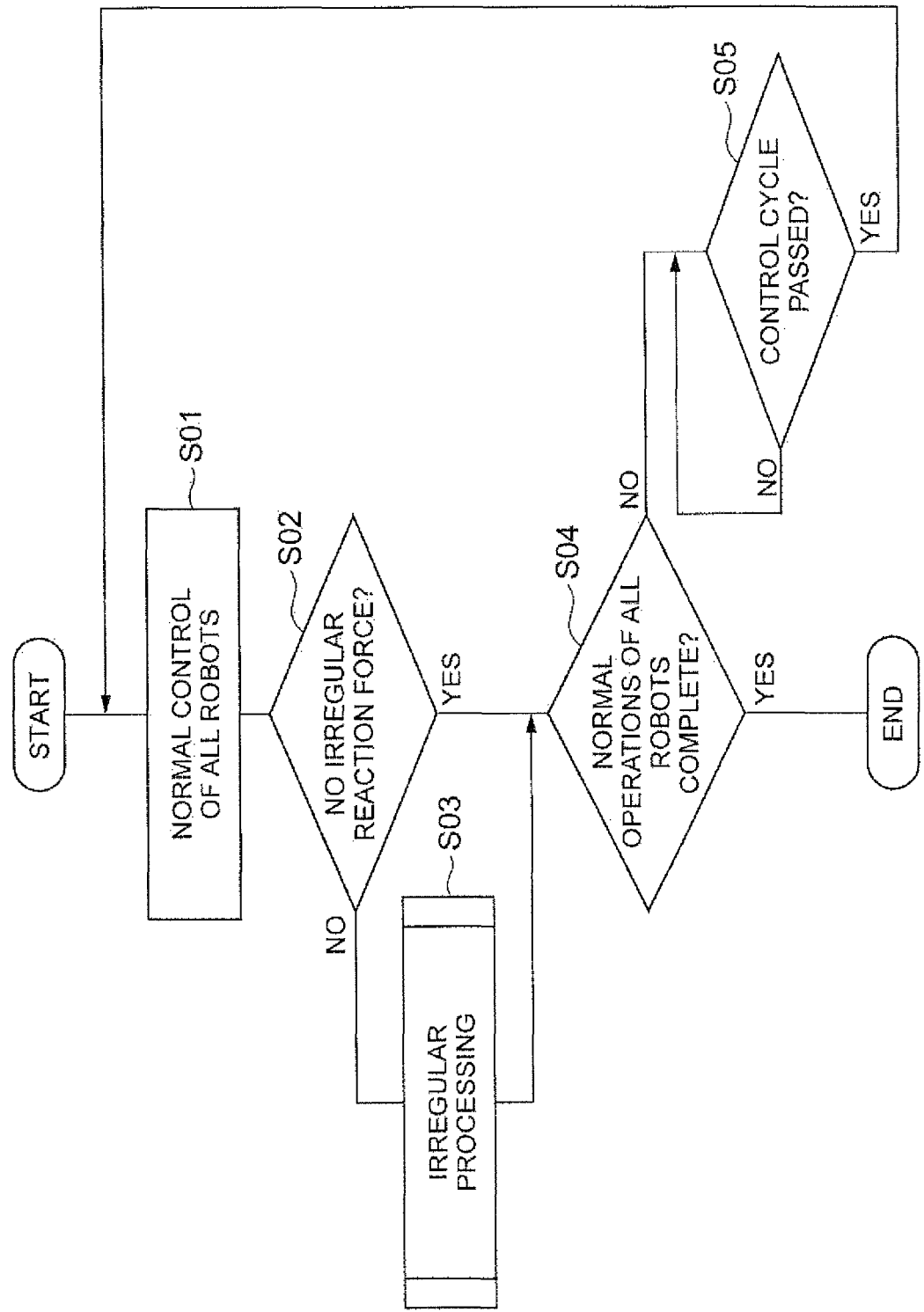
FIG. 4 is a flowchart showing an example operation control procedure of the robot.

FIG. 4 is a flowchart showing an example operation control procedure of the robot. As shown in FIG. 4, the controller 100 first executes steps S01 and S02. In step S01, the operation control unit 112 executes operating the robot 10 so as to reduce a deviation between the target posture of the robot 10 based on the operation command for the normal operation and the current posture of the robot 10, for the three robots 10. In step S02, the irregular control unit 113 confirms whether the irregular reaction force is detected in any robot 10.

In step S02, when it is determined that the irregular reaction force is detected in any robot 10, the controller 100 executes step S03. In step S03, the irregular control unit 113 controls at least the irregular robot to execute the counteractive operation (executes the above irregular processing). Additional processing contents of step S03 will be described later.

In step S02, when it is determined that the irregular reaction force is not detected in any robot 10, the controller 100 executes step S04 without executing step S03. In step S04, the operation control unit 112 confirms whether the normal operations of all the robots 10 are completed.

In step S04, when it is determined that the robot 10 still has not completed the normal operations, the controller 100 executes step S05. In step S05, the operation control unit 112 waits until a control cycle passes. Then, the controller 100 returns the processing to step S01. Thereafter, until the normal operations of all the robots 10 are completed, the control of the three robots 10 based on the operation commands for the normal operations is performed, and at least the irregular robot is repeatedly controlled to execute the counteractive operation. In step S04, when it is determined that the normal operations of all the robots 10 are completed, the operation control procedure of the robots 10 is completed.

Figure 5:
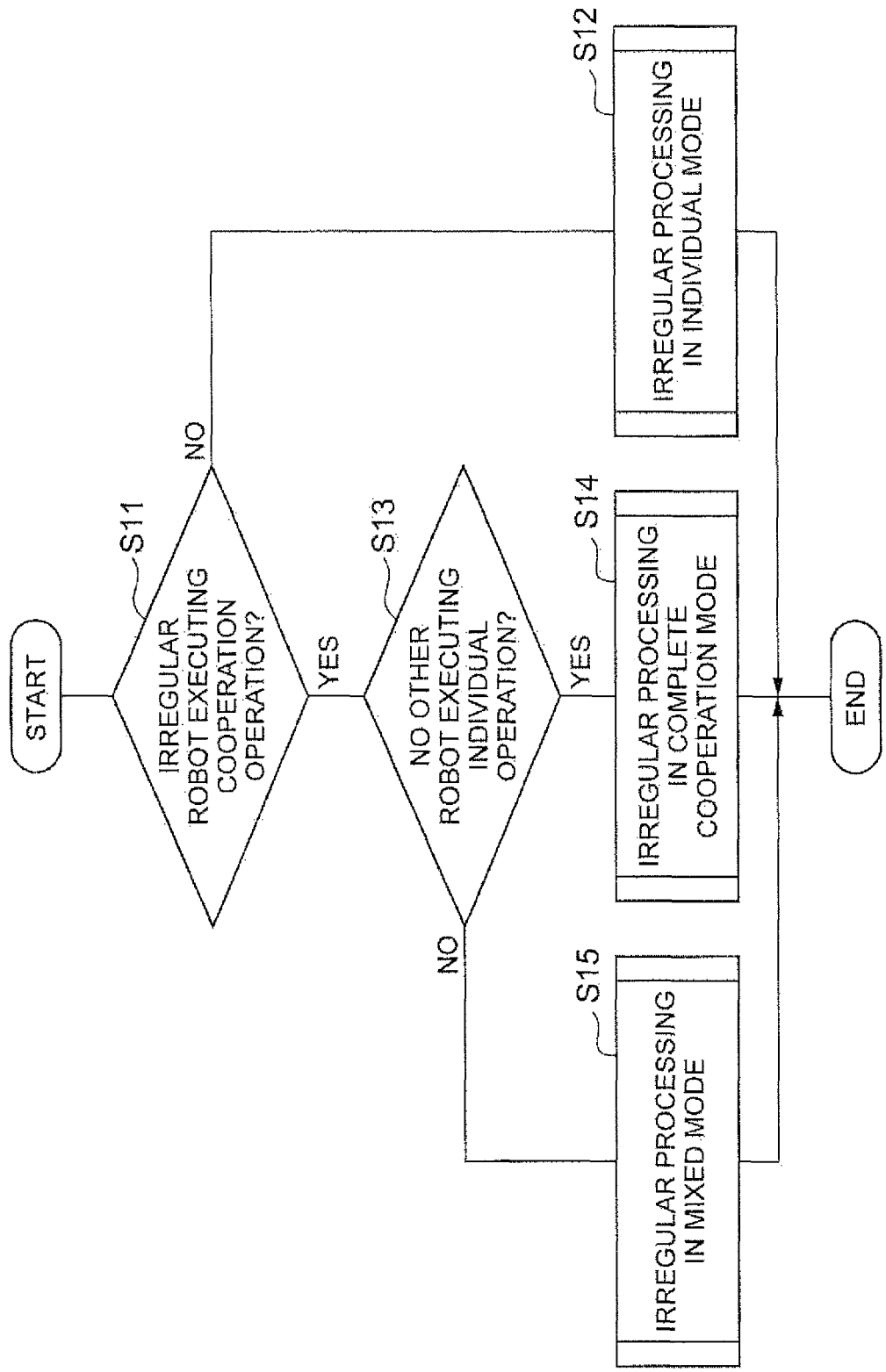
FIG. 5 is a flowchart showing an example irregular processing procedure.

FIG. 5 is a flowchart showing an example of an irregular processing procedure in step S03. As shown in FIG. 5, the controller 100 first executes step S11. In step S11, the irregular control unit 113 confirms whether the irregular robot is executing the collaborative operation. For example, when cooperation information indicates that operation commands of at least two robots 10 including the irregular robot are in a cooperation relation, the irregular control unit 113 determines that the irregular robot is executing the collaborative operation. The irregular control unit 113 may confirm whether the collaborative release information indicates that the at least two robots 10 including the irregular robot are controlled to collaboratively execute the counteractive operation, instead of whether the irregular robot is executing the collaborative operation.

In step S11, when it is determined that the irregular robot is not executing the collaborative operation, the controller 100 executes step S12. In step S12, the irregular control unit 113 executes the irregular processing in the individual mode.

In step S11, when it is determined that the irregular robot is executing the collaborative operation, the controller 100 executes step S13. In step S13, it is confirmed whether there is a robot 10 that is executing the individual operation, in addition to the robot 10 that is executing the collaborative operation with the irregular robot. For example, the irregular control unit 113 confirms whether there is a robot 10 whose operation command is not in a cooperation relation with the operation command of the irregular robot, based on the cooperation information. The irregular control unit 113 may confirm whether there is a robot 10 in which the collaborative release information does not indicate executing the counteractive operation in cooperation with the irregular robot, instead of whether there is a robot 10 that is executing the individual operation, in addition to the robot 10 that is executing the collaborative operation with the irregular robot.

In step S13, when it is determined that there is not a robot 10 that is executing the individual operation, in addition to the robot 10 that is executing the collaborative operation with the irregular robot (for example, when it is determined that there is not a robot 10 whose operation command is not in a cooperation relation with the operation command of the irregular robot), the controller 100 executes step S14. In step S14, the irregular control unit 113 executes the irregular processing in the complete cooperation mode.

In step S13, when it is determined that there is a robot 10 that is executing the individual operation, in addition to the robot 10 that is executing the collaborative operation with the irregular robot (for example, when it is determined that there is a robot 10 whose operation command is not in a cooperation relation with the operation command of the irregular robot), the controller 100 executes step S15. In step S15, the irregular control unit 113 executes the irregular processing in the mixed mode.

Figure 6:
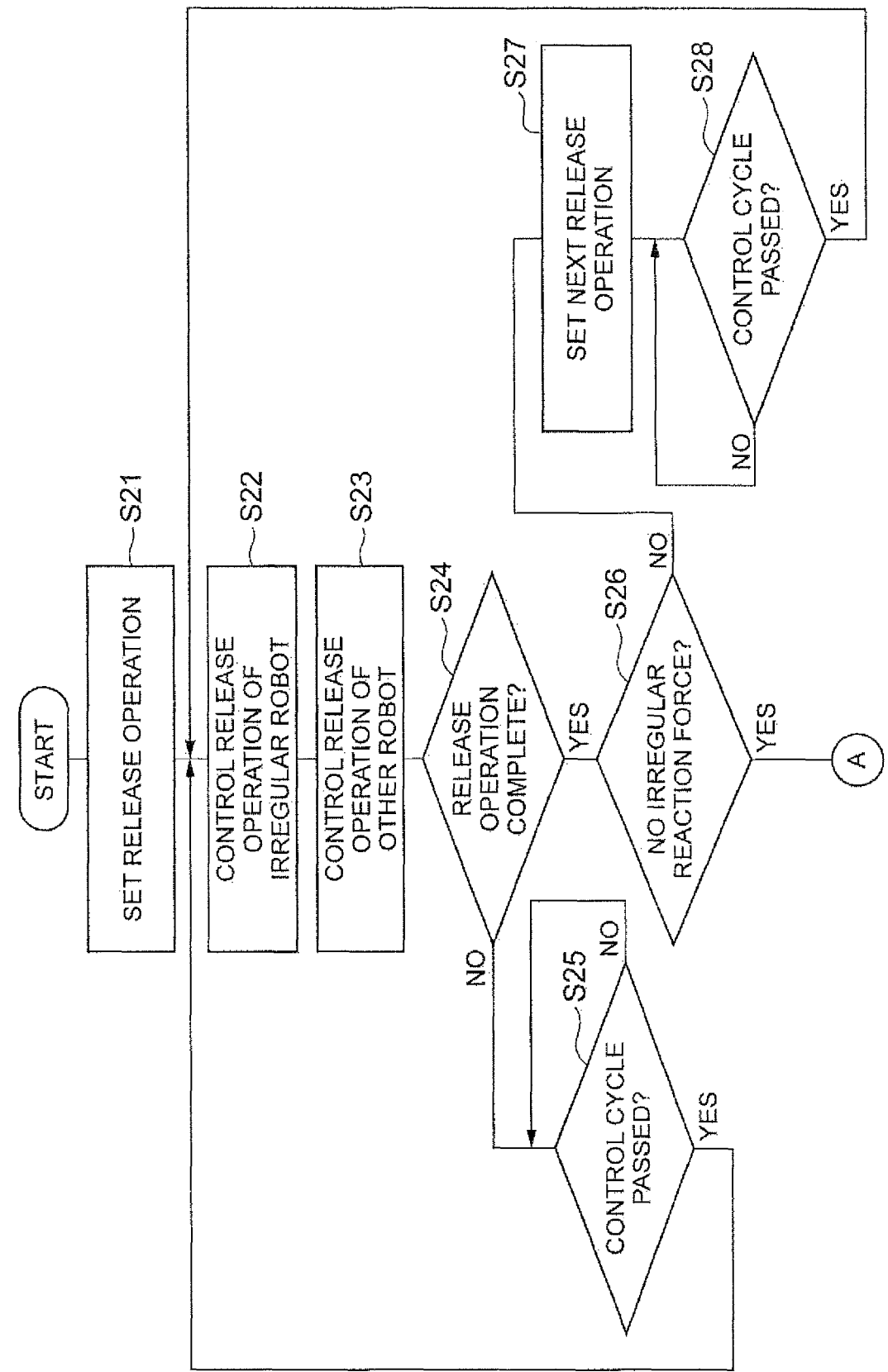
FIGS. 6 and 7 are flowcharts showing an example irregular processing procedure in a complete cooperation mode.
Figure 7:
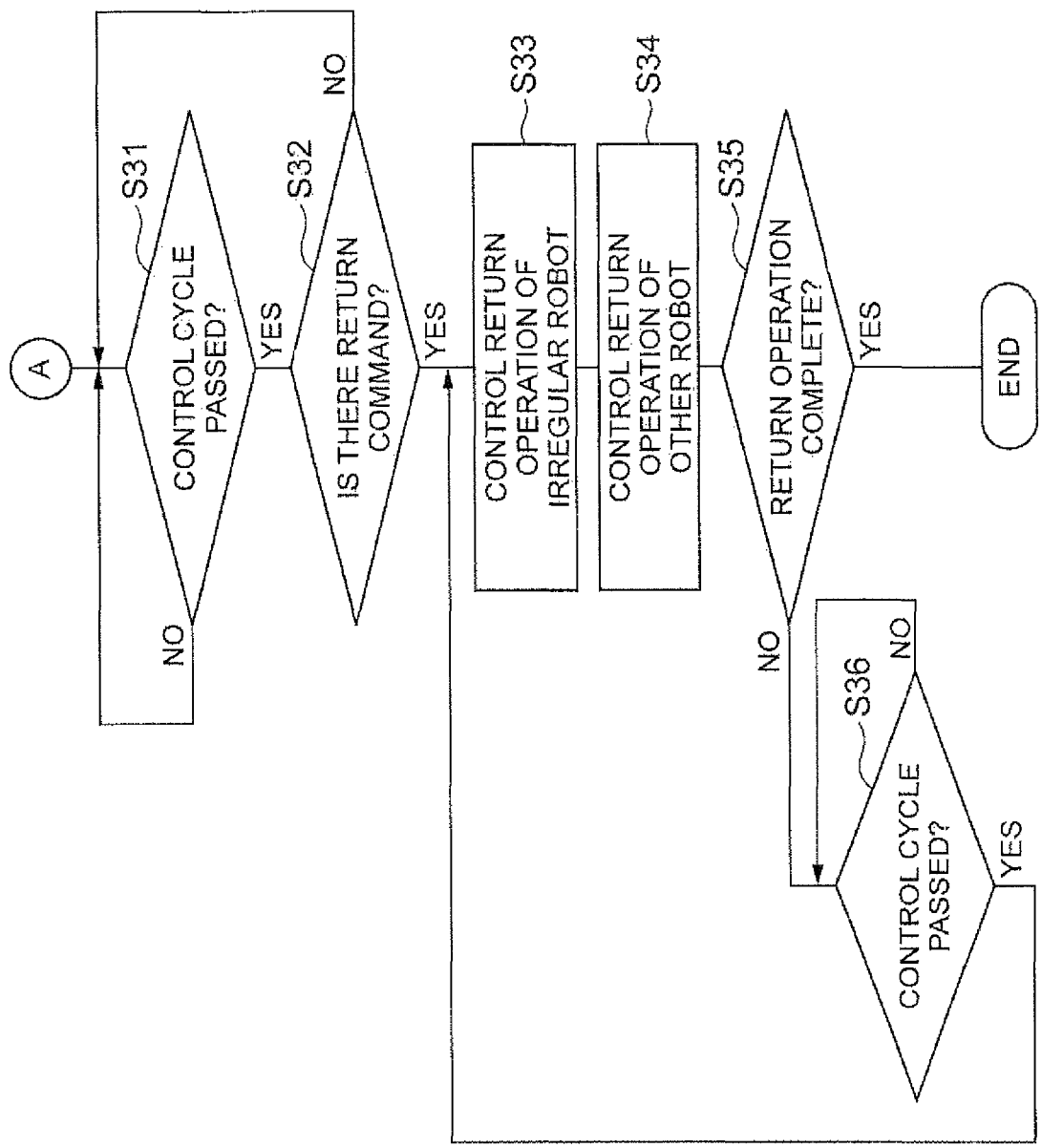

Hereinafter, an example procedure of the irregular processing in each mode will be described. FIGS. 6 and 7 are flowcharts showing an example irregular processing procedure in the complete cooperation mode. As shown in FIG. 6, the controller 100 first executes steps S21, S22, S23, and S24. In step S21, the irregular control unit 113 sets the counteractive operations of all the robots 10 so as to reduce the irregular reaction force. For example, the irregular control unit 113 sets the roll back operation from a point of time of detection of the irregular reaction force to a predetermined time before the point of time of detection as the counteractive operation, for all the robots 10.

The irregular control unit 113 may set the reaction force following operation of a predetermined distance or a predetermined time as the counteractive operation, for the irregular robot. In this case, the irregular control unit 113 sets an operation for using the position and the posture of the tip portion of the irregular robot executing the reaction force following operation as a reference and maintaining the relative position and the relative posture of the tip portion 12, as the counteractive operation of other robot 10.

In step S22, the irregular control unit 113 drives the actuators 41, 42, 43, 44, 45, and 46 of the irregular robot so as to reduce a deviation between the target posture of the irregular robot for the counteractive operation and the current posture of the irregular robot. In step S23, the irregular control unit 113 drives the actuators 41, 42, 43, 44, 45, and 46 of other robot 10 so as to reduce a deviation between the target posture of other robot 10 for the counteractive operation and the current posture of other robot 10. The execution order of steps S22 and S23 can be reversed. Further, steps S22 and S23 may be executed substantially simultaneously. In step S24, the irregular control unit 113 confirms whether the counteractive operation set in step S21 is completed.

In step S24, when it is determined that the counteractive operation is not completed, the controller 100 executes step S25. In step S25, the irregular control unit 113 waits until the control cycle passes. Then, the controller 100 returns the processing to step S22. Thereafter, until the counteractive operations of all the robots 10 are completed, the control of the three robots 10 based on the operation commands for the counteractive operations is repeated.

In step S24, when it is determined that the counteractive operation is completed, the controller 100 executes step S26. In step S26, the irregular control unit 113 confirms whether the irregular reaction force is detected again by the reaction force sensor 60 of the irregular robot.

In step S26, when it is determined that the irregular reaction force is detected, the controller 100 executes steps S27 and S28. In step S27, the irregular control unit 113 sets the counteractive operations of all the robots 10 so as to further reduce the irregular reaction force in the irregular robot. For example, the irregular control unit 113 sets the roll back operation to a point of time before a time longer than the predetermined time, as a further counteractive operation, for all the robots 10.

The irregular control unit 113 may set the reaction force following operation for the irregular reaction force detected again as a further counteractive operation, for the irregular robot. In this case, the irregular control unit 113 sets an operation for using the position and the posture of the tip portion of the irregular robot executing the reaction force following operation as a reference and maintaining the relative position and the relative posture of the tip portion 12, as a further counteractive operation of other robot 10.

In step S28, the irregular control unit 113 waits until the control cycle passes. Then, the controller 100 returns the processing to step S22. Thereafter, until the further counteractive operations of all the robots 10 are completed, the control of the three robots 10 based on the operation commands for the counteractive operations is repeated.

In step S26, when it is determined that the irregular reaction force is not detected, the controller 100 executes steps S31 and S32 as shown in FIG. 7. In step S31, the irregular control unit 113 waits until the control cycle passes. In step S32, the irregular control unit 113 confirms whether a return command to the normal operation is input. The return command is input to the input device 126 by the user, for example.

In step S32, when it is determined that the return command is not input, the controller 100 returns the processing to step S31. Thereafter, until the return command is input, all the robots 10 are maintained in a stationary or stand-by state.

In step S32, when it is determined that the return command is input, the controller 100 executes steps S33, S34, and S35. In step S33, the irregular control unit 113 drives the actuators 41, 42, 43, 44, 45, and 46 of the irregular robot so as to reduce a deviation between the target posture of the irregular robot for a return operation and the current posture of the irregular robot. The return operation is a reverse operation of the counteractive operation. The same is applied to the following.

In step S34, the irregular control unit 113 drives the actuators 41, 42, 43, 44, 45, and 46 of other robot 10 so as to reduce a deviation between the target posture of other robot 10 for the return operation and the current posture of other robot 10. Note that the execution order of steps S33 and S34 can be reversed. Further, steps S33 and S34 may be executed substantially simultaneously.

In step S35, the irregular control unit 113 confirms whether the return operation is completed. In step S35, when it is determined that the return operation is not completed, the controller 100 executes step S36. In step S36, the irregular control unit 113 waits until the control cycle passes. Then, the controller 100 returns the processing to step S33. Thereafter, until the return operations of all the robots 10 are completed, the control of the three robots 10 based on the operation commands for the return operations is repeated. In step S35, when it is determined that the return operation is completed, the irregular processing in the complete cooperation mode is completed.

Figure 8:
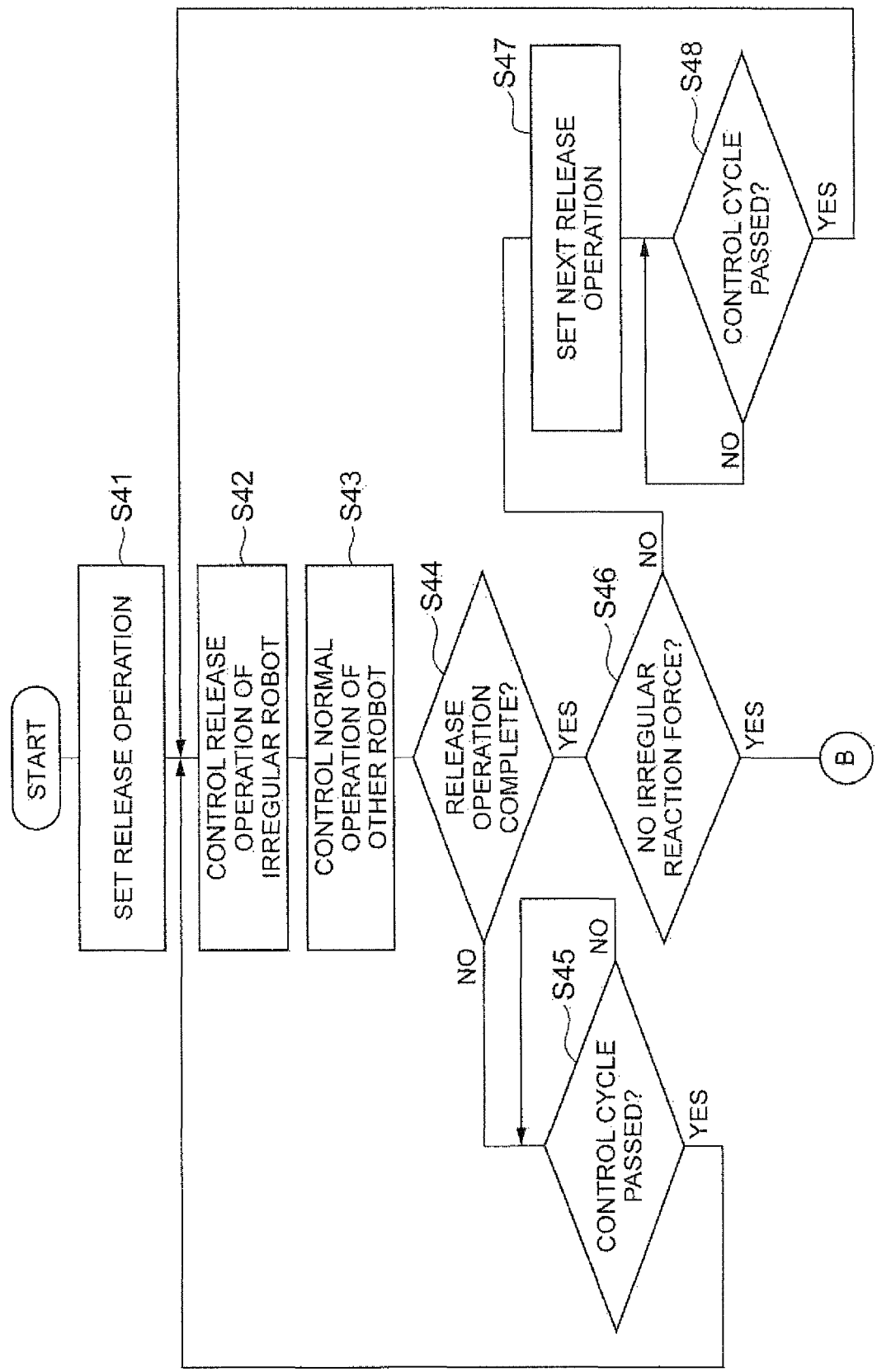
FIGS. 8 and 9 are flowcharts showing an example irregular processing procedure in an individual mode.
Figure 9:
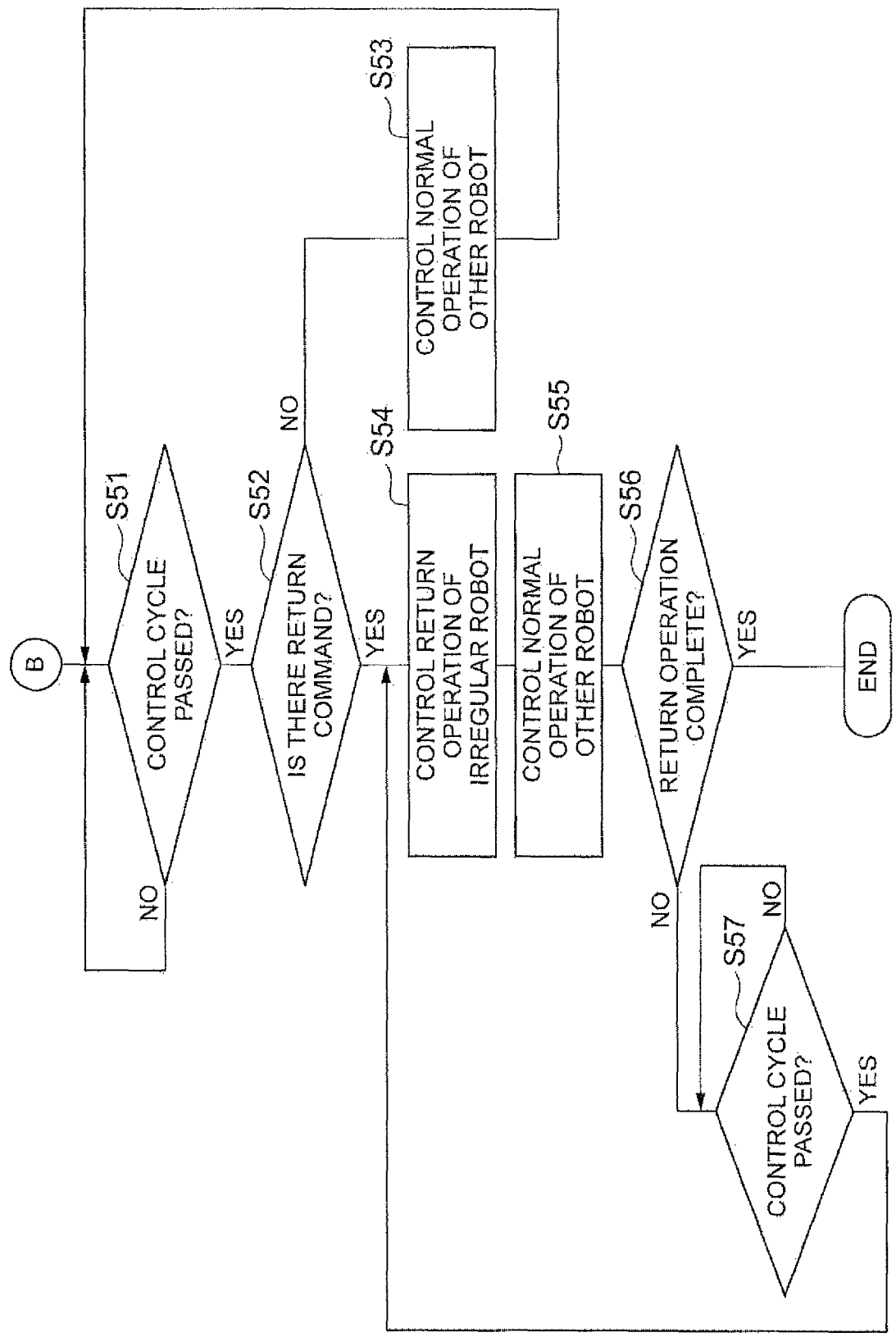

FIGS. 8 and 9 are flowcharts showing an example irregular processing procedure in the individual mode. As shown in FIG. 8, the controller 100 first executes steps S41, S42, S43, and S44. In step S41, the irregular control unit 113 sets the counteractive operation of the irregular robot so as to reduce the irregular reaction force. For example, the irregular control unit 113 sets the roll back operation from a point of time of detection of the irregular reaction force to a predetermined time before the point of time of detection, as the counteractive operation of the irregular robot. The irregular control unit 113 may set the reaction force following operation of a predetermined distance or a predetermined time as the counteractive operation of the irregular robot.

In step S42, the irregular control unit 113 drives the actuators 41, 42, 43, 44, 45, and 46 of the irregular robot so as to reduce a deviation between the target posture of the irregular robot for the counteractive operation and the current posture of the irregular robot. In step S43, the irregular control unit 113 drives the actuators 41, 42, 43, 44, 45, and 46 of other robot 10 so as to reduce a deviation between the target posture of other robot 10 for the normal operation and the current posture of other robot 10. Note that the execution order of steps S42 and S43 can be reversed. Further, steps S42 and S43 may be executed substantially simultaneously.

In step S44, the irregular control unit 113 confirms whether the counteractive operation set in step S41 is completed.

In step S44, when it is determined that the counteractive operation is not completed, the controller 100 executes step S45. In step S45, the irregular control unit 113 waits until the control cycle passes. Then, the controller 100 returns the processing to step S42. Thereafter, until the counteractive operation of the irregular robot is completed, the control of the irregular robot based on the operation command for the counteractive operation and the control of other robot 10 based on the operation command for the normal operation are repeated.

In step S44, when it is determined that the counteractive operation is completed, the controller 100 executes step S46. In step S46, the irregular control unit 113 confirms whether the irregular reaction force is detected again by the reaction force sensor 60 of the irregular robot.

In step S46, when it is determined that the irregular reaction force is detected, the controller 100 executes steps S47 and S48. In step S47, the irregular control unit 113 sets the counteractive operation of the irregular robot so as to further reduce the irregular reaction force in the irregular robot. For example, the irregular control unit 113 sets the roll back operation to a point of time before a time longer than the predetermined time, as a further counteractive operation of the irregular robot. The irregular control unit 113 may set the reaction force following operation for the irregular reaction force detected again as a further counteractive operation of the irregular robot.

In step S48, the irregular control unit 113 waits until the control cycle passes. Then, the controller 100 returns the processing to step S42. Thereafter, until the further counteractive operation of the irregular robot is completed, the control of the irregular robot based on the operation command for the counteractive operation and the control of other robot 10 based on the operation command for the normal operation are repeated.

In step S46, when it is determined that the irregular reaction force is not detected, the controller 100 executes steps S51 and S52 as shown in FIG. 9. In step S51, the irregular control unit 113 waits until the control cycle passes. In step S52, the irregular control unit 113 confirms whether a return command to the normal operation is input. The return command is input to the input device 126 by the user, for example.

In step S52, when it is determined that the return command is not input, the controller 100 executes step S53. In step S53, the irregular control unit 113 drives the actuators 41, 42, 43, 44, 45, and 46 of other robot 10 so as to reduce a deviation between the target posture of other robot 10 for the normal operation and the current posture of other robot 10. Then, the controller 100 returns the processing to step S51. Thereafter, until the return command is input, the irregular robot is maintained in a stationary or stand-by state, and the control of other robot 10 based on the operation command for the normal operation is continued.

In step S52, when it is determined that the return command is input, the controller 100 executes steps S54, S55, and S56. In step S54, the irregular control unit 113 drives the actuators 41, 42, 43, 44, 45, and 46 of the irregular robot so as to reduce a deviation between the target posture of the irregular robot for the return operation and the current posture of the irregular robot. In step S55, the irregular control unit 113 drives the actuators 41, 42, 43, 44, 45, and 46 of other robot 10 so as to reduce a deviation between the target posture of other robot 10 for the normal operation and the current posture of other robot 10. Note that the execution order of steps S54 and S55 can be reversed. Further, steps S54 and S55 may be executed substantially simultaneously. In step S56, the irregular control unit 113 confirms whether the return operation is completed.

In step S56, when it is determined that the return operation is not completed, the controller 100 executes step S57. In step S57, the irregular control unit 113 waits until the control cycle passes. Then, the controller 100 returns the processing to step S54. Thereafter, until the return operation of the irregular robot is completed, the control of the irregular robot based on the operation command for the return operation and the control of other robot 10 based on the operation command for the normal operation are repeated. In step S56, when it is determined that the return operation is completed, the irregular processing in the individual mode is completed.

Figure 10:
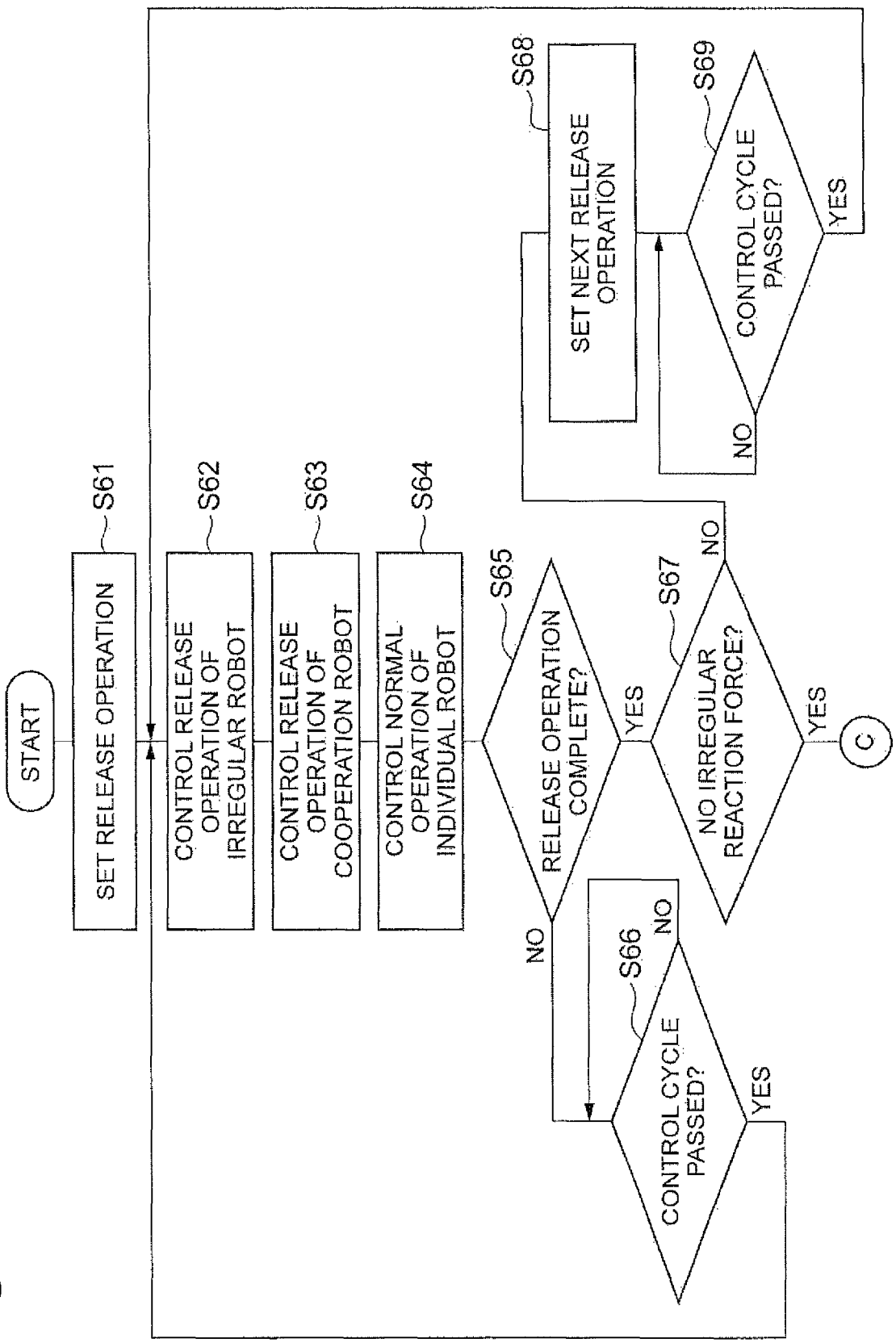
FIGS. 10 and 11 are flowcharts showing an example irregular processing procedure in a mixed mode.
Figure 11:
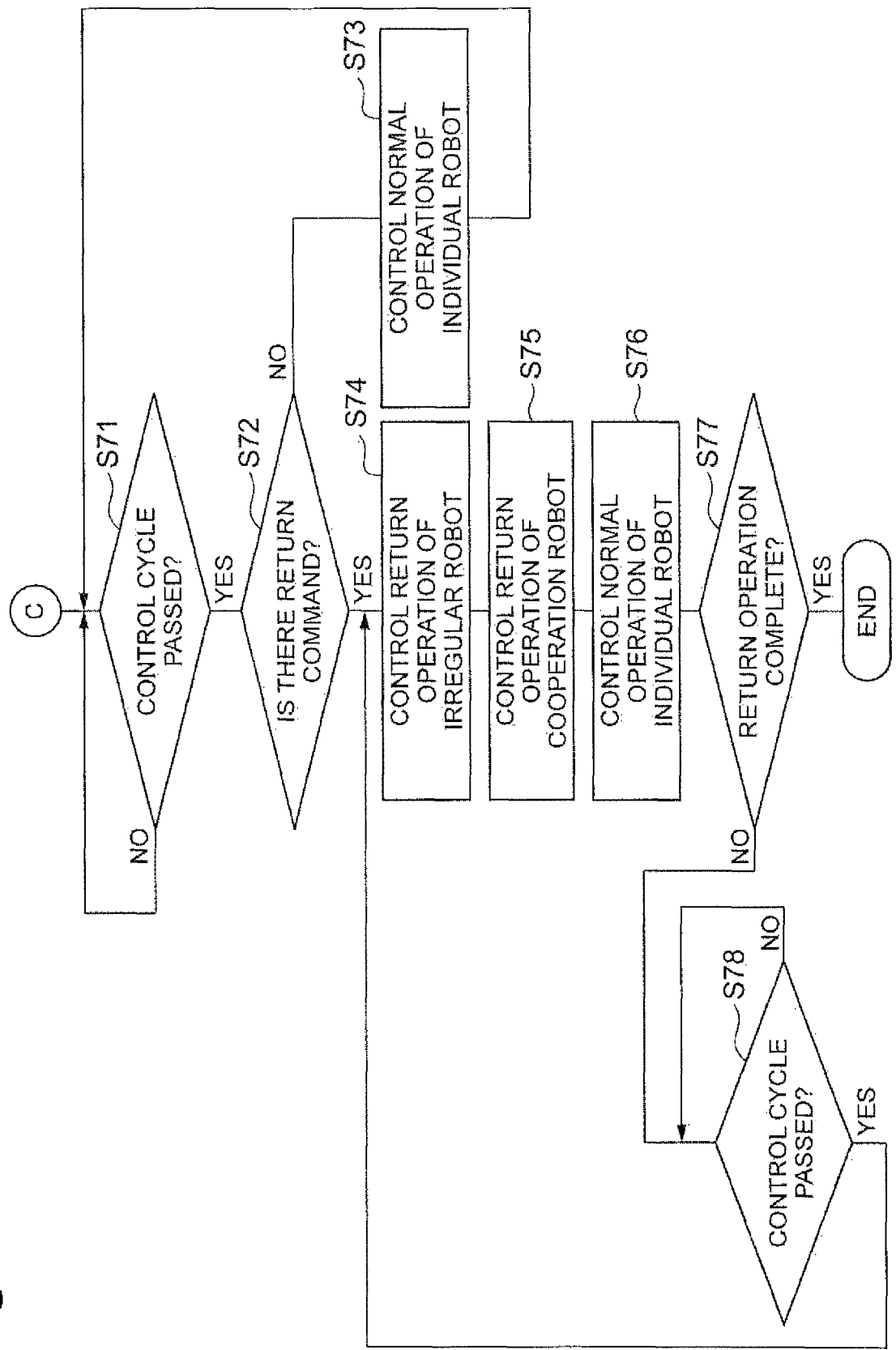

FIGS. 10 and 11 are flowcharts showing an example of an irregular processing procedure in the mixed mode. As described above, in the irregular processing in the mixed mode, another robot 10 (hereinafter, referred to as a "cooperation robot") that executes the counteractive operation in cooperation with the irregular robot and other robot 10 (hereinafter referred to as an "individual robot") that executes the individual operation are mixed.

As shown in FIG. 10, the controller 100 first executes steps S61, S62, S63, S64, and S65. In step S61, the irregular control unit 113 sets the counteractive operation of the irregular robot and the cooperation robot so as to reduce the irregular reaction force. For example, the irregular control unit 113 sets the roll back operation from a point of time of detection of the irregular reaction force to a predetermined time before the point of time of detection as the counteractive operation, for the irregular robot and the cooperation robot.

The irregular control unit 113 may set the reaction force following operation of a predetermined distance or a predetermined time as the counteractive operation, for the irregular robot. In this case, the irregular control unit 113 sets an operation for using the position and the posture of the tip portion of the irregular robot executing the reaction force following operation as a reference and maintaining the relative position and the relative posture of the tip portion 12, as the counteractive operation of the cooperation robot.

In step S62, the irregular control unit 113 drives the actuators 41, 42, 43, 44, 45, and 46 of the irregular robot so as to reduce a deviation between the target posture of the irregular robot for the counteractive operation and the current posture of the irregular robot. In step S63, the irregular control unit 113 drives the actuators 41, 42, 43, 44, 45, and 46 of the cooperation robot so as to reduce a deviation between the target posture of the cooperation robot for the counteractive operation and the current posture of the cooperation robot.

In step S64, the irregular control unit 113 drives the actuators 41, 42, 43, 44, 45, and 46 of the individual robot so as to reduce a deviation between the target posture of the individual robot for the normal operation and the current posture of the individual robot. Note that the execution order of steps S62, S63, and S64 can be changed. Further, steps S62, S63, and S64 may be executed substantially simultaneously. In step S65, the irregular control unit 113 confirms whether the counteractive operation set in step S61 is completed.

In step S65, when it is determined that the counteractive operation is not completed, the controller 100 executes step S66. In step S66, the irregular control unit 113 waits until the control cycle passes. Then, the controller 100 returns the processing to step S62. Thereafter, until the counteractive operation of the irregular robot is completed, the control of the irregular robot and the cooperation robot based on the operation commands for the counteractive operations and the control of the individual robot based on the operation command for the normal operation are repeated.

In step S65, when it is determined that the counteractive operation is completed, the controller 100 executes step S67. In step S67, the irregular control unit 113 confirms whether the irregular reaction force is detected again by the reaction force sensor 60 of the irregular robot.

In step S67, when it is determined that the irregular reaction force is detected, the controller 100 executes steps S68 and S69. In step S68, the irregular control unit 113 sets the counteractive operation of the irregular robot and the cooperation robot so as to further reduce the irregular reaction force in the irregular robot. For example, the irregular control unit 113 sets the roll back operation to a point of time before a time longer than the predetermined time, as a further counteractive operation of the irregular robot and the cooperation robot.

The irregular control unit 113 may set the reaction force following operation for the irregular reaction force detected again as a further counteractive operation of the irregular robot. In this case, the irregular control unit 113 sets an operation for using the position and the posture of the tip portion of the irregular robot executing the reaction force following operation as a reference and maintaining the relative position and the relative posture of the tip portion 12, as a further counteractive operation of the cooperation robot.

In step S69, the irregular control unit 113 waits until the control cycle passes. Then, the controller 100 returns the processing to step S62. Thereafter, until the further counteractive operations of the irregular robot and the cooperation robot are completed, the control of the irregular robot and the cooperation robot based on the operation commands for the counteractive operations and the control of the individual robot based on the operation command for the normal operation are repeated.

In step S67, when it is determined that the irregular reaction force is not detected, the controller 100 executes steps S71 and S72 as shown in FIG. 11. In step S71, the irregular control unit 113 waits until the control cycle passes. In step S72, the irregular control unit 113 confirms whether a return command to the normal operation is input. The return command is input to the input device 126 by the user, for example.

In step S72, when it is determined that the return command is not input, the controller 100 executes step S73. In step S73, the irregular control unit 113 drives the actuators 41, 42, 43, 44, 45, and 46 of the individual robot so as to reduce a deviation between the target posture of the individual robot for the normal operation and the current posture of the individual robot. Then, the controller 100 returns the processing to step S71. Thereafter, until the return command is input, the irregular robot and the cooperation robot are maintained in a stationary or stand-by state, and the control of the individual robot based on the operation command for the normal operation is continued.

In step S72, when it is determined that the return command is input, the controller 100 executes steps S74, S75, S76, and S77. In step S74, the irregular control unit 113 drives the actuators 41, 42, 43, 44, 45, and 46 of the irregular robot so as to reduce a deviation between the target posture of the irregular robot for the return operation and the current posture of the irregular robot. In step S75, the irregular control unit 113 drives the actuators 41, 42, 43, 44, 45, and 46 of the cooperation robot so as to reduce a deviation between the target posture of the cooperation robot for the return operation and the current posture of the cooperation robot.

In step S76, the irregular control unit 113 drives the actuators 41, 42, 43, 44, 45, and 46 of the individual robot so as to reduce a deviation between the target posture of the individual robot for the normal operation and the current posture of the individual robot. Note that the execution order of steps S74, S75, and S76 can be changed. Further, steps S74, S75, and S76 may be executed substantially simultaneously. In step S77, the irregular control unit 113 confirms whether the return operation is completed.

In step S77, when it is determined that the return operation is not completed, the controller 100 executes step S78. In step S78, the irregular control unit 113 waits until the control cycle passes. Then, the controller 100 returns the processing to step S74. Thereafter, until the return operations of the irregular robot and the cooperation robot are completed, the control of the irregular robot and the cooperation robot based on the operation commands for the return operations and the control of the individual robot based on the operation command for the normal operation are repeated. In step S77, when it is determined that the return operation is completed, the irregular processing in the mixed mode is completed.

In FIGS. 8 to 11, it may be assumed that the irregular control unit 113 is controlling the individual robot to continue the normal operation in parallel with the counteractive operation of the irregular robot and the cooperation robot. However, the operation control unit 112 may be assumed to be controlling the individual robot to continue the normal operation. Even when the irregular control unit 113 controls the irregular robot to execute the collaborative operation with another robot 10 and controls the irregular robot not to execute the collaborative operation with other robot 10, the operation control unit 112 may be configured to control the other robot 10 to continue the normal operation. Therefore, it can be said that the irregular control unit 113 controls the individual robot to continue the normal operation.

Figure 12:
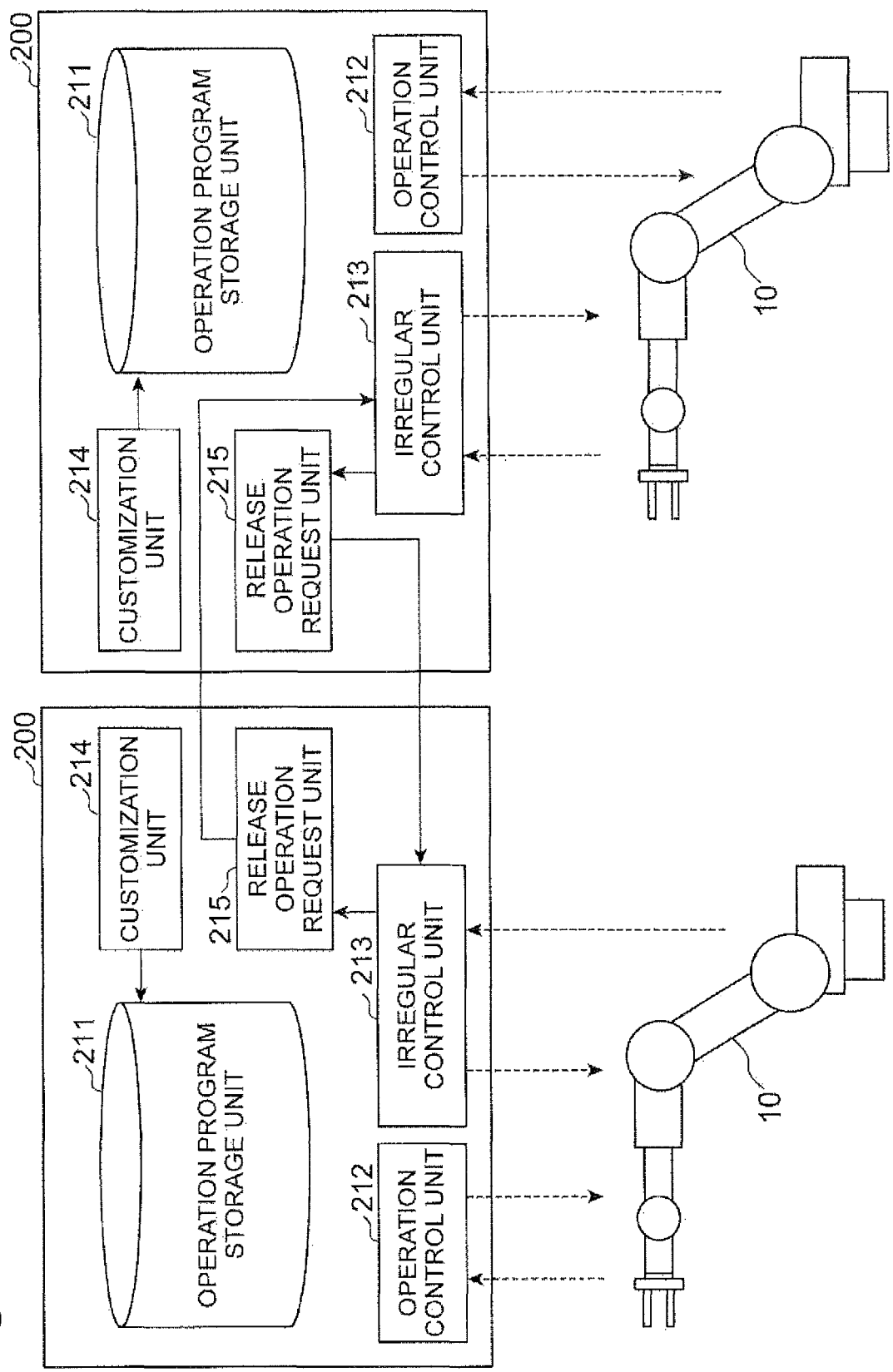
FIG. 12 is a schematic diagram showing an example robot system.

FIG. 12 is a schematic diagram showing an example robot system. In the robot system 1 of FIG. 1, one controller 100 controls the plurality of robots 10. However, in a robot system of FIG. 12, a plurality of controllers 200 control the plurality of robots 10, respectively. Although the number of robots 10 in FIG. 12 is two to simplify illustration, the number of robots 10 may be three or more.

The controller 200 is configured to execute controlling a control target robot 10 (hereinafter, referred to as an "own robot") to execute a collaborative operation with the other robot 10 on the same work piece, executing the own robot to execute a counteractive operation to eliminate an irregular state, in response to the detection of the irregular state of the control target robot 10, and requesting the controller 200 of the other robot 10 to control the other robot 10 to execute a counteractive operation in a cooperation relation with the counteractive operation.

In some examples, the controller 200 has an operation program storage unit 211, an operation control unit 212, an irregular control unit 213, a customization unit 214, and a counteractive operation request unit 215, as functional blocks. The operation program storage unit 211 stores an operation program for the own robot among the operation programs stored in the above-described operation program storage unit 111. The operation control unit 212 performs a function of operating the own robot among the functions of the above-described operation control unit 112.

The irregular control unit 213 performs a function of operating the own robot among the functions of the above-described irregular control unit 113. For example, in response to the detection of the irregular state is detected by the own robot, the irregular control unit 213 controls the own robot to execute the counteractive operation to eliminate the irregular state. Further, the irregular control unit 213 controls the own robot to execute the counteractive operation in a cooperation relation with a counteractive operation of the other robot 10, in accordance with a request from the controller 200 of the other robot 10. In some examples, the irregular control unit 213 may be further configured to control the first robot 10 to execute a second collaborative counteractive operation with the second robot 10 to eliminate an irregular state of the second robot 10 in accordance with a request received from the controller 200 of the second robot 10 during the collaborative operation.

The customization unit 214 performs a function of acquiring collaborative release information of the own robot based on user input, among the functions of the above-described customization unit 114. When the irregular control unit 213 controls the own robot to execute the counteractive operation, the counteractive operation request unit 215 requests the controller 200 of the other robot 10 to control the other robot 10 (the above-described cooperation robot) to execute a counteractive operation in a cooperation relation with the counteractive operation. In some examples, the operation control unit 212 may be configured to control a first robot 10 to execute a collaborative operation with a second robot 10 on a work piece; a counteractive operation request unit 215 may be configured to request, in response to a detection of an irregular state of the first robot 10 during the collaborative operation, a controller 200 of the second robot 10 to control the second robot 10 to execute a collaborative counteractive operation to eliminate the irregular state; and an irregular control unit 213 may be configure to control the first robot 10 to execute the collaborative counteractive operation with the second robot to eliminate the irregular state.

Figure 13:
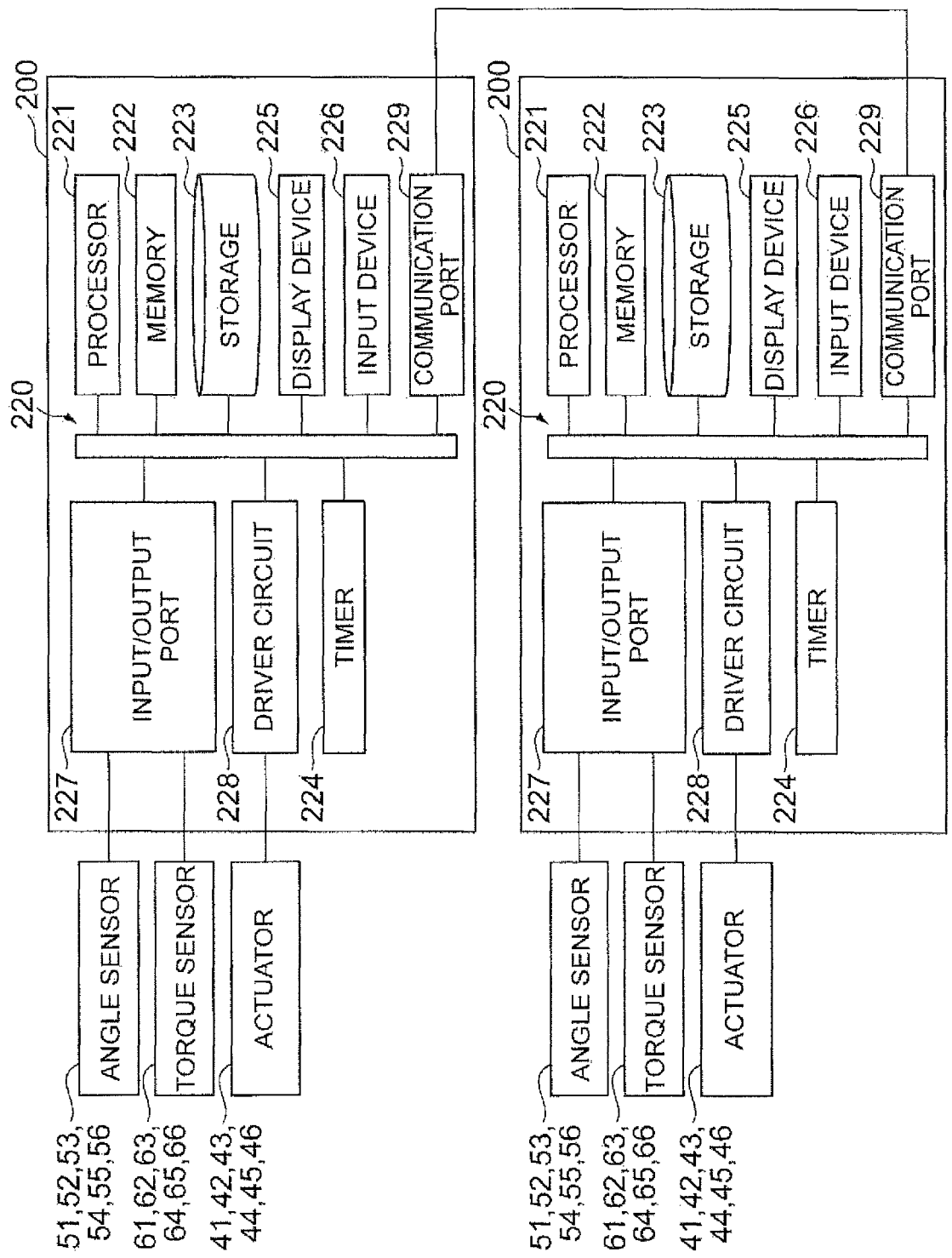
FIG. 13 is a block diagram showing an example hardware configuration of the controller of FIG. 12.

FIG. 13 is a block diagram showing an example hardware configuration of the controller 200. As shown in FIG. 13, the controller 200 has a circuit 220. The circuit 220 includes one or more processors 221, a memory 222, a storage 223, a timer 224, a display device 225, an input device 226, an input/output port 227, a driver circuit 228, and a communication port 229. The storage 223 has a computer-readable storage medium such as a non-volatile semiconductor memory. The storage 223 stores programs for causing the controller 200 to control a control target robot 10 (hereinafter, referred to as an "own robot") to execute a collaborative operation with the other robot 10 on the same work piece, to control the own robot to execute a counteractive operation to eliminate an irregular state, in response to the detection of the irregular state is detected by the control target robot 10, and to request the controller 200 of the other robot 10 to control the other robot 10 to execute a counteractive operation in a cooperation relation with the counteractive operation. For example, the storage 223 stores a program for configuring each functional block described above in the controller 200.

The memory 222 temporarily stores a program loaded from the storage medium of the storage 223 and a calculation result of the processor 221. The processor 221 configures each functional block of the controller 200 by executing the above program in cooperation with the memory 222. The timer 224 measures an elapsed time by counting clock pulses of a predetermined cycle in accordance with a command from the processor 221. The display device 225 includes, for example, a liquid crystal display, an organic EL display, or the like, and is used for displaying information to the user. The input device 226 acquires operation input by the user. Specific examples of the input device 226 include a keypad and the like. The display device 225 and the input device 226 may be integrated as a so-called touch panel. The display device 225 and the input device 226 may be teaching pendants that are separated from a main body of the controller 100 and communicate with the main body by wire or wirelessly.

The input/output port 227 inputs/outputs information to/from angle sensors 51 to 56 and torque sensors 61 to 66 of the robot 10, in accordance with a command from the processor 221. The driver circuit 228 outputs drive power to the actuators 41 to 46 of the robot 10, in accordance with a command from the processor 221. The communication port 229 communicates with other controller 200, in accordance with a command from the processor 221.

The circuit 120 may comprise a program for configuring each function by a program. In other examples, the circuit 120 may configure at least a part of the functions by a dedicated logic circuit or an application specific integrated circuit (ASIC) in which the logic circuit is integrated.

Figure 14:
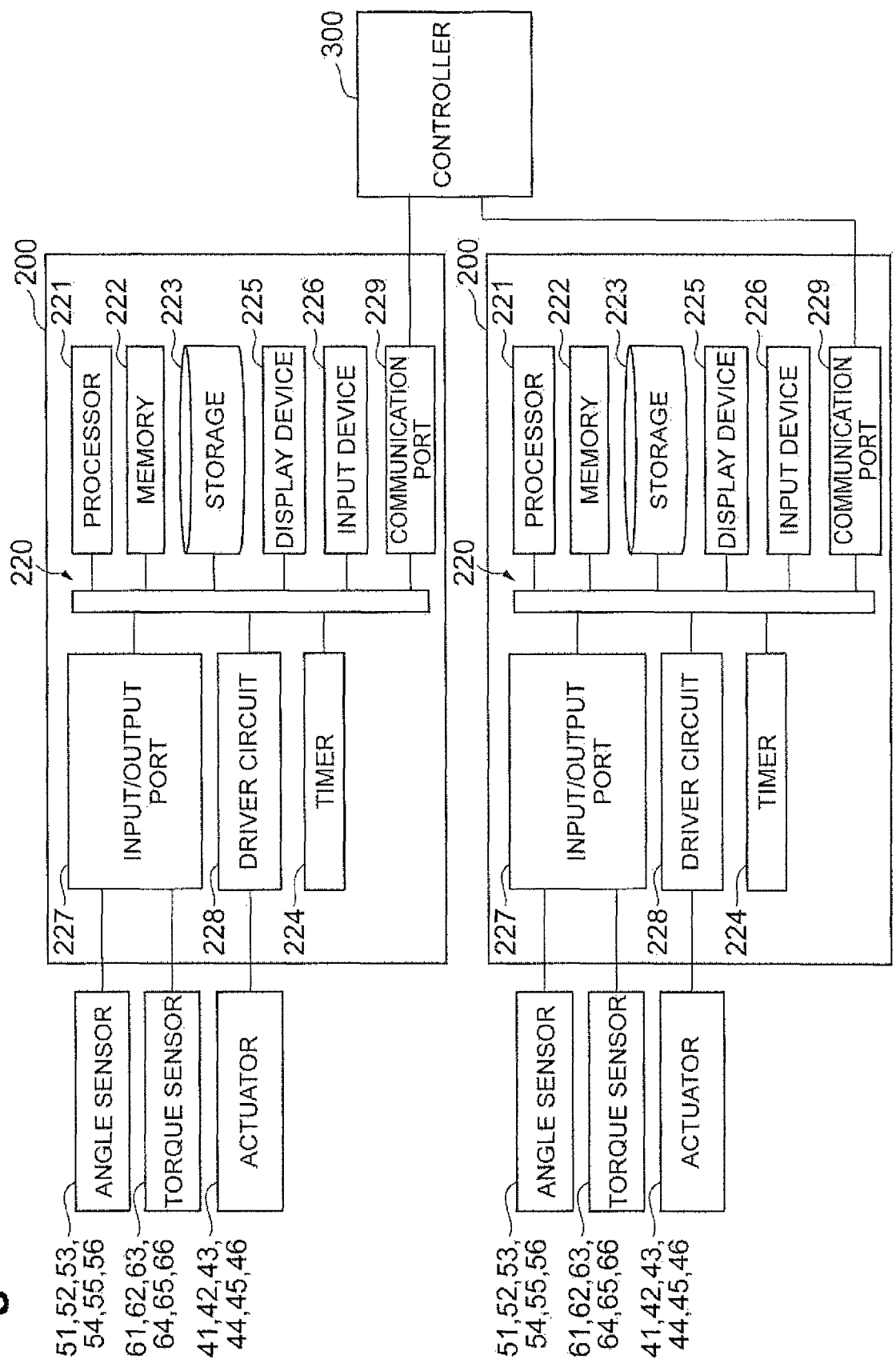
FIG. 14 is a block diagram showing an example controller.

As shown in FIG. 14, the robot system 1 may further include a controller 300 that outputs operation commands to the plurality of controllers 200. In this case, processing such as mode setting of the irregular processing and setting of the counteractive operation may be executed in the controller 300. Examples of the controller 300 include a programmable logic controller and the like.

As described above, the robot system may include two robots 10, the operation control unit 112 that controls the two robots 10 to execute the collaborative operation on the same work piece, and the irregular control unit 113 that controls the two robots 10 to collaboratively execute the counteractive operation to eliminate the irregular state, in response to the detection of the irregular state of one of the two robots 10 executing the collaborative operation.

In response to the detection of the irregular state of one of the two robots 10 executing the collaborative operation, one robot 10 may be controlled to quickly execute the counteractive operation. However, if one robot 10 interrupts the collaborative operation and executes the counteractive operation, the cooperation relation with the other robot 10 is broken. For example, in the case where the two robots 10 convey the same work piece in cooperation with each other, if the cooperation relation between the two robots 10 is broken, the work piece may be dropped or damaged. On the other hand, in some example robot systems, the counteractive operation to eliminate the irregular state is collaboratively executed by the two robots 10. As a result, the cooperation relation between the two robots 10 is maintained even when the irregular state is released. Therefore, it is effective for both eliminating (e.g., terminating) the irregular state of the plurality of robots 10 executing the collaborative operation and continuing (e.g., maintaining) the cooperation state of the plurality of robots 10.

The operation control unit 112 may control the two robots 10 to further execute the individual operations independent of each other, and in response to the detection of the irregular state of one of the two robots 10 executing the individual operations, the irregular control unit 113 may control one robot 10 to execute the counteractive operation and control the other robot 10 to continue the individual operation. In this case, when it is acceptable to terminate or discontinue the cooperation relation, the other robot 10 is controlled to continue the individual operation, so that the work delay of the two robots 10 associated with the execution of the counteractive operation may be reduced or avoided.

The operation control unit 112 may operate the two robots in accordance with an operation program including a plurality of time-series operation commands every two robots 10, and in response to the detection of the irregular state of one of the two robots 10, the irregular control unit 113 may select any one of the irregular processing in the cooperation mode in which the two robots 10 are controlled to collaboratively execute the counteractive operation and the irregular processing in the individual mode in which the other robot 10 is controlled to continue the individual operation, based on a relation between the operation commands for the two robots 10. In this case, appropriate selection of the irregular processing in the cooperation mode or the irregular processing in the individual mode can be easily performed.

The robot system may include three or more robots 10 including the two robots 10. The operation control unit, 112 may operate the three or more robots 10 in accordance with an operation program including a plurality of time-series operation commands every three or more robots 10. In response to the detection of the irregular state of one of the three or more robots 10 and operation commands for at least two robots 10 including one robot 10 are in a cooperation relation, the irregular control unit 113 may select the irregular processing in the cooperation mode and control the at least two robots 10 to collaboratively execute the counteractive operation. In some examples, even when the irregular state is detected in a state in which the robots 10 executing the collaborative operation and the robot 10 executing the individual operation are mixed in the three or more robots 10, the irregular processing in the cooperation mode or the irregular processing in the individual mode can be appropriately selected, and the robot to be the target of the irregular processing in the cooperation mode can be appropriately selected.

The operation program may further include cooperation information indicating in time series whether the operation commands of the two robots 10 are in a cooperation relation, and in response to the detection of the irregular state of one of the two robots 10, the irregular control unit 113 may select any one of the irregular processing in the cooperation mode and the irregular processing in the individual mode, based on the cooperation information. In this case, appropriate selection of the irregular processing in the cooperation mode or the irregular processing in the individual mode may be more quickly or efficiently performed in advance, based on the cooperation information included in the operation program.

The robot system may include three or more robots 10 including the two robots 10. The operation control unit 112 may operate the three or more robots 10 in accordance with an operation program including a plurality of time-series operation commands every three or more robots 10. The operation program may further include cooperation information indicating in time series which of the three robots 10 have operation commands in a cooperation relation. In response to the detection of the irregular state of one of the three or more robots 10 and the cooperation information indicates that operation commands of at least two robots 10 including one robot 10 are in the cooperation relation, the irregular control unit may select the irregular processing in the cooperation mode and control the at least two robots 10 to collaboratively execute the counteractive operation. In some examples, even when the irregular state is detected in a state in which the robots 10 executing the collaborative operation and the robot 10 executing the individual operation are mixed in the three or more robots 10, appropriate selection of the irregular processing in the cooperation mode or the irregular processing in the individual mode and appropriate selection of the robot 10 to be the target of the irregular processing in the cooperation mode can be performed more quickly.

The robot system may further include the customization unit 114 that, based on the user input, acquires the collaborative release information indicating in time series whether to control the two robots 10 to collaboratively execute the counteractive operation in response to the detection of the irregular state of one of the two robots 10. In response to the detection of the irregular state of one of the two robots 10, the irregular control unit 113 may select any one of the irregular processing in the cooperation mode in which the two robots 10 are controlled to collaboratively execute the counteractive operation and the irregular processing in the individual mode in which the other robot 10 is controlled to continue the individual operation, based on the collaborative release information. In some examples, the irregular processing in the cooperation mode or the irregular processing in the individual mode can be selected under conditions that are better matched with user needs.

The robot system 1 may include three or more robots 10 including the two robots 10. The customization unit 114 may acquire collaborative release information indicating in time series which of the three or more robots 10 are controlled to collaboratively execute the counteractive operation, based on the user input. In response to the detection of the irregular state of one of the three or more robots 10 and the collaborative release information indicates that at least two robots 10 including one robot 10 are controlled to collaboratively execute the counteractive operation, the irregular control unit 113 may select the irregular processing in the cooperation mode and control the at least two robots 10 to collaboratively execute the counteractive operation. In some examples, the irregular processing in the cooperation mode or the irregular processing in the individual mode can be selected under conditions that are matched with needs where the robots 10 controlled to collaboratively execute the counteractive operation and the robot 10 controlled to continue the individual operation are mixed in the three or more robots 10, and the robot 10 to be the target of the irregular processing in the cooperation mode can be selected.

The irregular control unit 113 may control at least one robot 10 to execute the counteractive operation so that the posture of one robot 10 detecting the irregular state changes from a posture at a point of time of detection of the irregular state. In this case, the irregular state can be released more reliably.

Each of the two robots 10 may have the tip portion 12 and the articulated arm 20 that changes the position and the posture of the tip portion 12. In response to the detection of the irregular state of one of the two robots 10 executing the collaborative operation, the irregular control unit 113 may control the two robots 10 to collaboratively execute the counteractive operation so that the position and the posture of the tip portion 12 of one robot 10 are used as a reference to maintain the relative position and the relative posture of the tip portion 12 of the other robot 10. In this case, a cooperation relation between the two robots 10 can be maintained more reliably.

The operation control unit 112 may control the two robots 10 to execute a collaborative operation for holding and conveying the same work piece in cooperation with each other in order to help achieve both the continuation of the cooperation state of the two robots 10 and the release of the irregular state.

Each of the plurality of robots 10 may be a human-collaborative robot. In this case, even in a human-collaborative environment in which the irregular state is released, the two robots 10 can be controlled to cooperate with each other, and a variety of human related works can be supported.

Each of the two robots 10 may include the reaction force sensor 60 that detects the irregular reaction force associated with contacting the peripheral object as an irregular state. In response to the detection of the irregular reaction force in the reaction force sensor 60 of any one of the two robots 10 executing the collaborative operation, the irregular control unit 113 may control the two robots 10 to collaboratively execute the counteractive operation so as to reduce the irregular reaction force, and to help achieve both the reduction (release) of the irregular reaction force to be an example of the irregular state and the continuation of the cooperation state.

In response to the detection of the irregular reaction force in one of the two robots 10 executing the collaborative operation, the irregular control unit 113 may control the two robots 10 to execute the counteractive operation so as to roll back an operation to a point of time of detection of the irregular reaction force to a point of time before the point of time of detection. In this case, even when an operation command for the counteractive operation is not newly calculated, the counteractive operation in one robot 10 and the counteractive operation in the other robot 10 can be quickly executed. Further, since the operation in which the irregular reaction force is not detected before the point of time of detection of the irregular reaction force is rolled back, an occurrence of a secondary irregular state due to the counteractive operation may be suppressed or avoided.

In response to the detection of the irregular reaction force in one of the two robots 10 executing the collaborative operation, the irregular control unit 113 may modify a motion amount of the counteractive operation to be collaboratively executed by the two robots 10, based on the magnitude of the irregular reaction force in one robot 10. In this case, the irregular reaction force can be reduced more reliably.

When the two robots 10 are controlled to collaboratively execute the counteractive operation so as to reduce the irregular reaction force detected in one of the two robots 10 executing the collaborative operation and then the irregular reaction force is detected again by the reaction force sensor 60 of one robot 10, the irregular control unit 113 may control the two robots 10 to collaboratively execute a further counteractive operation so as to further reduce the irregular reaction force. In this case, the irregular reaction force can be reduced more reliably.

The operation control unit 112 and the irregular control unit 113 may repeatedly execute operating the robot 10 so as to reduce a deviation between the target posture and the current posture of the robot 10, at the same control cycle for the two robots 10. In this case, since a deviation between operation timings of the two robots 10 is suppressed to one control cycle or less, a cooperation state of the two robots 10 can be maintained more reliably.

It is to be understood that not all aspects, advantages and features described herein may necessarily be achieved by, or included in, any one particular example embodiment. Indeed, having described and illustrated various examples herein, it should be apparent that other examples may be modified in arrangement and detail. For example, the system for executing the return operation in accordance with the return command after the counteractive operation has been described. However, when the counteractive operation is completed, at least the operation of the robot that has executed the counteractive operation may be completed.

We claim all modifications and variations coming within the spirit and scope of the subject matter claimed herein.

Regarding the above embodiments, the following appendices are appended.

(Appendix 1) A robot system comprising:

two robots;

an operation control unit configured to control the two robots to execute a collaborative operation on a work piece; and an irregular control unit configured to control, in response to a detection of an irregular state of one of the two robots during the collaborative operation, the two robots to collaboratively execute a counteractive operation to eliminate the irregular state.

(Appendix 2) The robot system according to appendix 1, wherein the operation control unit is further configured to control the two robots to execute individual operations independent of each other, and the irregular control unit is further configured to control, in response to a detection of the irregular state of the first robot during the first individual operation, the one robot to execute the counteractive operation and to control another robot to continue the individual operation.

(Appendix 3) The robot system according to appendix 2, wherein the operation control unit is configured to control the two robots in accordance with an operation program including a plurality of time-series operation commands every two robots, and in response to a detection of an irregular state of the two robots, the irregular control unit selects any one of irregular processing in a cooperation mode in which the two robots are controlled to collaboratively execute the counteractive operation and irregular processing in an individual mode in which one of the two robots is controlled to execute the counteractive operation and another robot is controlled to continue the individual operation based on a relation between the operation commands for the two robots.

(Appendix 4) The robot system according to appendix 3, further comprising: three or more robots including the two robots, wherein the operation control unit is configured to control the three or more robots in accordance with an operation program including a plurality of time-series operation commands every three or more robots, and in response to a detection of an irregular state of one of the three or more robots and operation commands for at least two robots including the one robot are in a cooperation relation, the irregular control unit selects the irregular processing in the cooperation mode and controls the at least two robots to collaboratively execute the counteractive operation.

(Appendix 5) The robot system according to appendix 3, wherein the operation program further includes cooperation information indicating in time series whether the operation commands of the two robots are in a cooperation relation, and in response to a detection of the irregular state of one of the two robots, the irregular control unit selects any one of the irregular processing in the cooperation mode and the irregular processing in the individual mode, based on the cooperation information.

(Appendix 6) The robot system according to appendix 5, further comprising: three or more robots including the two robots, wherein the operation control unit operates the three or more robots in accordance with an operation program including a plurality of time-series operation commands every three or more robots, the operation program further includes cooperation information indicating in time series which of the three robots have operation commands in a cooperation relation, and in response to a detection of the irregular state of one of the three or more robots and in a case that the cooperation information indicates that operation commands of at least two robots including the one robot are in a cooperation relation, the irregular control unit selects the irregular processing in the cooperation mode and controls the at least two robots to collaboratively execute the counteractive operation.

(Appendix 7) The robot system according to appendix 2, further comprising: a customization unit configured to, based on user input, acquire collaborative release information indicating in time series whether it is necessary to control the two robots to collaboratively execute the counteractive operation in response to a detection of the irregular state of one of the two robots, wherein in response to a detection of the irregular state of one of the two robots, the irregular control unit selects any one of irregular processing in a cooperation mode in which the two robots are controlled to collaboratively execute the counteractive operation and irregular processing in an individual mode in which one of the two robots is controlled to execute the counteractive operation and another robot is controlled to continue the individual operation, based on the collaborative release information.

(Appendix 8) The robot system according to appendix 7, further comprising: three or more robots including the two robots, wherein the customization unit acquires collaborative release information indicating in time series which of the three or more robots are controlled to collaboratively execute the counteractive operation, based on the user input, and in response to a detection of the irregular state of one of the three or more robots and the collaborative release information indicates that at least two robots including the one robot are controlled to collaboratively execute the counteractive operation, the irregular control unit selects the irregular processing in the cooperation mode and controls the at least two robots to collaboratively execute the counteractive operation.

(Appendix 9) The robot system according to any one of appendices 1 to 8, wherein the irregular control unit is further configured to control at least one robot to execute the counteractive operation so that a posture of one robot detecting the irregular state changes from a posture at a point of time of detection of the irregular state.

(Appendix 10) The robot system according to any one of appendices 1 to 9, wherein each of the two robots has a tip portion and an articulated arm that changes a position and a posture of the tip portion, and in response to a detection of the irregular state of one of the two robots executing the collaborative operation, the irregular control unit is further configured to control the two robots to collaboratively execute the counteractive operation so that the position and the posture of the tip portion of the one robot are used as a reference to maintain a relative position and a relative posture of the tip portion of the other robot.

(Appendix 11) The robot system according to any one of appendices 1 to 10, wherein the operation control unit is further configured to control the two robots to execute a collaborative operation for collaboratively holding and conveying the work piece.

(Appendix 12) The robot system according to any one of appendices 1 to 11, wherein each of the plurality of robots is a human-collaborative robot.

(Appendix 13) The robot system according to any one of appendices 1 to 12, wherein each of the two robots includes a reaction force sensor that detects an irregular reaction force associated with contacting a peripheral object as the irregular state, and in response to a detection of the irregular reaction force by the reaction force sensor of any one of the two robots executing the collaborative operation, the irregular control unit is further configured to control the two robots to collaboratively execute the counteractive operation to reduce the irregular reaction force.

(Appendix 14) The robot system according to appendix 13, wherein in response to a detection of the irregular reaction force in one of the two robots executing the collaborative operation, the irregular control unit is further configured to control the two robots to execute the counteractive operation so as to roll back an operation to a point of time of detection of the irregular reaction force to a point of time before the point of time of detection.

(Appendix 15) The robot system according to appendix 13 or 14, wherein in response to a detection of the irregular reaction force in one of the two robots executing the collaborative operation, the irregular control unit is further configured to modify a motion amount of the counteractive operation to be collaboratively executed by the two robots, based on a magnitude of the irregular reaction force in the one robot.

(Appendix 16) The robot system according to appendix 15, wherein when the two robots executing the collaborative operation are controlled to collaboratively execute the counteractive operation to reduce the irregular reaction force detected by one of the two robots and then the irregular reaction force is detected again by the reaction force sensor of the one robot, the irregular control unit is further configured to control the two robots to collaboratively execute a further counteractive operation so as to further reduce the irregular reaction force.

(Appendix 17) The robot system according to any one of appendices 1 to 16, wherein the operation control unit and the irregular control unit repeatedly execute operating the robot so as to reduce a deviation between a target posture and a current posture of the robot, at the same control cycle for the two robots.

(Appendix 18) A controller comprising:

an operation control unit configured to control a robot to execute a collaborative operation with another robot on a work piece;

an irregular control unit configured to control the robot to execute a counteractive operation to eliminate an irregular state in response to a detection of the irregular state of the robot; and a counteractive operation request unit configured to request a controller of the other robot to control the other robot to execute a counteractive operation in a cooperation relation with the counteractive operation.

(Appendix 19) The controller according to appendix 18, wherein the irregular control unit is further configured to control the robot to execute the counteractive operation in a cooperation relation with a counteractive operation of the other robot, in accordance with a request from the controller of the other robot.

(Appendix 20) A control method comprising:

controlling two robots to execute a collaborative operation on a work piece; and controlling the two robots to collaboratively execute a counteractive operation to eliminate an irregular state in response to a detection of the irregular state of one of the two robots executing the collaborative operation.

What is claimed is:

1. A robot system comprising:
   a first robot including a first tip portion and a first articulated arm that is configured to reposition the first tip portion;
   a second robot including a second tip portion and a second articulated arm that is configured to reposition the second tip portion; and
   circuitry configured to:
   control the first and second robots to execute a collaborative operation on a work piece;
   control, in response to a detection of an irregular state of the first robot during the collaborative operation, the first and second robots to execute a collaborative counteractive operation to eliminate the irregular state, wherein the irregular state of the first robot indicates contact between the first robot and one or more peripheral objects;
   control, during the collaborative counteractive operation, the first robot to move the first articulated arm and to eliminate the contact with the one or more peripheral objects; and
   control, during the collaborative counteractive operation, the second robot to maintain a relative orientation between the second tip portion and the first tip portion while the first robot moves the first articulated arm.

2. The robot system according to claim 1, wherein the circuitry is further configured to:
   control, in response to a detection of an irregular state of the second robot during the collaborative operation, the first and second robots to execute a second collaborative counteractive operation to eliminate the irregular state of the second robot, wherein the irregular state of the second robot indicates a second contact between the second robot and the one or more peripheral objects;
   control, during the second collaborative counteractive operation, the second robot to move the second articulated arm and to remove the second contact with the one or more peripheral objects; and
   control, during the second collaborative counteractive operation, the first robot to maintain the relative orientation between the first tip portion and the second tip portion while the second robot moves the second articulated arm.

3. The robot system according to claim 1, wherein the circuitry is further configured to:
   control the first robot to execute a first individual operation and control the second robot to execute a second individual operation; and
   control, in response to a detection of a second irregular state of the first robot during the first individual operation, the first robot to execute an individual counteractive operation to eliminate the second irregular state of the first robot while the second robot continues to execute the second individual operation.

4. The robot system according to claim 3, wherein the circuitry is further configured to:
select, in response to a detection of an unidentified irregular state of the first robot, any one of a first response mode in which the first and second robots are controlled to execute the collaborative counteractive operation and a second response mode in which the first robot is controlled to execute the individual counteractive operation while the second robot continues to execute the second individual operation; and
control the first and second robots in accordance with selected response mode.

5. The robot system according to claim 4, wherein the circuitry is further configured to:
control the first and second robots in accordance with an operation program including a collaborative period associated with the collaborative operation and an individual period associated with the first and the second individual operations; and
select the first response mode if the unidentified irregular state is detected during the collaborative period and select the second response mode if the unidentified irregular state is detected during the individual period.

6. The robot system according to claim 5, wherein the operation program further includes a designated period overlapping with the collaborative period, and the circuitry is further configured to:
modify the designated period based on user input; and
select the first response mode if the unidentified irregular state is detected during the designated period.

7. The robot system according to claim 5, wherein the operation program further includes first sequential operation commands for the first robot and second sequential operation commands for the second robot, and
the circuitry is further configured to detect the collaborative period and the individual period based on a comparison between the first sequential operation commands and the second sequential operation commands.

8. The robot system according to claim 5, wherein the operation program further includes first sequential operation commands for the first robot and second sequential operation commands for the second robot,
the second sequential operation commands include normal commands each of which defines the second individual operation and collaboration commands each of which designates one of the first sequential operation commands as a target of collaboration, and
the circuitry is further configured to:
control the second robot to execute the collaborative operation based on the collaboration commands and the first sequential operation commands; and
detect the collaborative period and the individual period based on the normal commands and the collaboration commands.

9. The robot system according to claim 1 further comprising a third robot, wherein the circuitry is further configured to:
control the third robot to execute an individual operation; and
control, in response to the detection of the irregular state of the first robot, the first and second robots to execute the collaborative counteractive operation while the third robot continues to execute the individual operation.

10. The robot system according to claim 1, wherein the circuitry is further configured to change a posture of the first robot and a posture of the second robot in the collaborative counteractive operation.

11. The robot system according to claim 1, wherein the circuitry is further configured to control the first and second robots to execute the collaborative operation including collaboratively holding and conveying the work piece.

12. The robot system according to claim 1, wherein the first robot includes a reaction force sensor that detects a reaction force associated with contacting the one or more peripheral objects, and
the circuitry is further configured to control, in response to the detection of the irregular state of the first robot based on the reaction force detected during the collaborative operation, the first and second robots to execute the collaborative counteractive operation to reduce the reaction force by moving away from the one or more peripheral objects.

13. The robot system according to claim 12, wherein the collaborative operation includes sequential motions, and
the circuitry is further configured to control the first and second robots to execute the sequential motions in reverse order from a point in time that the irregular state of the first robot was detected.

14. The robot system according to claim 12, wherein the circuitry is further configured to modify a motion amount of the collaborative counteractive operation based on a magnitude of the reaction force.

15. The robot system according to claim 12, wherein the circuitry is further configured to control the first and second robots to execute a further collaborative counteractive operation in response to a detection of a further reaction force after execution of the collaborative counteractive operation.

16. A controller comprising circuitry configured to:
control a first robot to execute a collaborative operation with a second robot on a work piece, wherein the first robot includes a first tip portion and a first articulated arm that is configured to reposition the first tip portion;
request, in response to a detection of contact between the first robot and one or more peripheral objects during the collaborative operation, a second controller of the second robot to control the second robot to execute a collaborative counteractive operation to eliminate the contact, wherein the second robot includes a second tip portion and a second articulated arm that is configured to reposition the second tip portion; and
control the first robot to execute a collaborative counteractive operation with the second robot including moving the first articulated arm to eliminate the contact with the one or more peripheral objects, wherein during the collaborative counteractive operation the second robot maintains a relative orientation between the first tip portion and the second tip portion while the first robot moves the first articulated arm.

17. The controller according to claim 16, wherein the circuitry is further configured to:
receive a second request from the second controller, in response to a detection of a second contact between the second robot and the one or more peripheral objects during the collaborative operation;
control the first robot to execute a second collaborative counteractive operation with the second robot in which the second robot moves the second articulated arm to eliminate the second contact between the second robot and the one or more peripheral objects in accordance with the second request; and control, during the second collaborative counteractive operation, the first robot to maintain the relative orientation between the first tip portion and the second tip portion while the second robot moves the second articulated arm.

18. A control method comprising:

controlling a first robot and a second robot to execute a collaborative operation on a work piece, wherein the first robot includes a first tip portion and a first articulated arm that is configured to reposition the first tip portion, and wherein the second robot includes a second tip portion and a second articulated arm that is configured to reposition the second tip portion;

controlling, in response to a detection of contact between the first robot and one or more peripheral objects during the collaborative operation, the first and second robots to execute a collaborative counteractive operation to eliminate the contact;

controlling, during the collaborative counteractive operation, the first robot to move the first articulated arm and to eliminate the contact with the one or more peripheral objects; and controlling, during the collaborative counteractive operation, the second robot to maintain a relative orientation between the second tip portion and the first tip portion while the first robot moves the first articulated arm.

19. The control method according to claim 18, wherein the method further comprises:

controlling, in response to a detection of a second contact between the second robot and the one or more objects during the collaborative operation, the first and second robots to execute a second collaborative counteractive operation to eliminate the second contact;

controlling, during the second collaborative counteractive operation, the second robot to move the second articulated arm and to eliminate the second contact with the one or more peripheral objects; and controlling, during the second collaborative counteractive operation, the first robot to maintain to relative orientation between the first tip portion and the second tip portion while the second robot moves the second articulated arm.

20. The control method according to claim 18, wherein the method further comprises:

detecting a reaction force associated with contacting the one or more peripheral objects during the collaborative operation, wherein the collaborative operation includes sequential motions;

controlling, in response to the reaction force detected during the collaborative operation, the first and second robots to execute the collaborative counteractive operation to reduce the reaction force; and controlling the first and second robots to execute the sequential motions in reverse order from a point in time that the reaction force was detected.

* * * * *